US008491392B2

(12) United States Patent
Baerlocher

(10) Patent No.: US 8,491,392 B2
(45) Date of Patent: Jul. 23, 2013

(54) GAMING SYSTEM AND METHOD HAVING PROMOTIONS BASED ON PLAYER SELECTED GAMING ENVIRONMENT PREFERENCES

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 617 days.

(21) Appl. No.: 11/552,451

(22) Filed: Oct. 24, 2006

(65) Prior Publication Data

US 2008/0096650 A1 Apr. 24, 2008

(51) Int. Cl.
*A63F 13/00* (2006.01)

(52) U.S. Cl.
USPC .............................................. 463/42; 463/25

(58) Field of Classification Search
USPC .................................. 463/20, 25, 43; 84/615
See application file for complete search history.

(56) References Cited

U.S. PATENT DOCUMENTS

| | | | |
|---|---|---|---|
| 4,618,150 | A | 10/1986 | Kimura |
| 4,660,107 | A | 4/1987 | Chippendale, Jr. |
| 4,695,053 | A | 9/1987 | Vazquez, Jr. et al. |
| 5,221,801 | A | 6/1993 | Bruti et al. |
| 5,223,828 | A | 6/1993 | McKiel, Jr. |
| 5,242,163 | A | 9/1993 | Fulton |
| 5,266,736 | A | 11/1993 | Saito |
| 5,331,112 | A | 7/1994 | Sato et al. |
| 5,342,047 | A | 8/1994 | Heidel et al. |
| 5,371,345 | A | 12/1994 | LeStrange et al. |
| 5,390,938 | A | 2/1995 | Takeya |
| 5,393,061 | A | 2/1995 | Manship et al. |
| 5,393,070 | A | 2/1995 | Best |
| 5,430,835 | A | 7/1995 | Williams et al. |
| 5,469,511 | A | 11/1995 | Lewis et al. |
| 5,470,233 | A | 11/1995 | Fruchterman et al. |
| 5,472,197 | A | 12/1995 | Gwiasda et al. |

(Continued)

FOREIGN PATENT DOCUMENTS

| | | |
|---|---|---|
| EP | 1 225 565 | 7/2002 |
| EP | 1 439 507 | 3/2005 |

(Continued)

OTHER PUBLICATIONS

American Bandstand Advertisement, written by Anchor Games, published in 2001.

(Continued)

*Primary Examiner* — Paul A. D'Agostino
*Assistant Examiner* — Ankit Doshi
(74) *Attorney, Agent, or Firm* — Neal, Gerber & Eisenberg LLP

(57) ABSTRACT

A gaming system and method including a tracking system or a player tracking system and plurality of gaming machines. The gaming machines include at least one display device and a plurality of player preferences selections. These player preference selections enable a player to choose one or more elements of the background or an entertainment setting of the gaming machine while they are playing a game at the gaming machine. The gaming machine enables the player to enter identification information at the gaming machine and choose at least one preference. The gaming machine tracks all of the preference selections made by the player. Upon meeting certain promotional criteria, the gaming machine determines a promotion to provide the player based on the preferences of that player. That is, the player does not directly select any promotions. The gaming system determines personalized promotions for the player based on the preference selections made by that player.

52 Claims, 16 Drawing Sheets

U.S. PATENT DOCUMENTS

| | | | |
|---|---|---|---|
| 5,606,144 | A | 2/1997 | Dabby |
| 5,655,961 | A | 8/1997 | Acres et al. |
| 5,695,188 | A | 12/1997 | Ishibashi |
| 5,697,843 | A | 12/1997 | Manship et al. |
| 5,702,304 | A | 12/1997 | Acres et al. |
| 5,703,310 | A | 12/1997 | Kurakake et al. |
| 5,707,286 | A | 1/1998 | Carlson |
| 5,715,459 | A | 2/1998 | Celi |
| 5,741,183 | A | 4/1998 | Acres et al. |
| 5,745,761 | A | 4/1998 | Celi |
| 5,745,762 | A | 4/1998 | Celi |
| 5,752,882 | A | 5/1998 | Acres et al. |
| 5,758,875 | A | 6/1998 | Giacalone, Jr. |
| 5,762,552 | A | 6/1998 | Vuong et al. |
| 5,772,509 | A | 6/1998 | Weiss |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,820,459 | A | 10/1998 | Acres et al. |
| 5,823,873 | A | 10/1998 | Moody |
| 5,833,538 | A | 11/1998 | Weiss |
| 5,836,817 | A | 11/1998 | Acres et al. |
| 5,854,927 | A | 12/1998 | Gelissen |
| 5,880,386 | A | 3/1999 | Wachi et al. |
| 5,889,990 | A | 3/1999 | Coleman |
| 5,902,184 | A | 5/1999 | Bennett et al. |
| 5,908,354 | A | 6/1999 | Okuniewicz |
| 5,910,048 | A | 6/1999 | Feinberg |
| 5,911,071 | A | 6/1999 | Jordan |
| 5,920,720 | A | 7/1999 | Toutonghi |
| 5,920,842 | A | 7/1999 | Cooper et al. |
| 5,923,878 | A | 7/1999 | Marsland |
| 5,923,880 | A | 7/1999 | Rose |
| 5,930,509 | A | 7/1999 | Yates |
| 5,937,193 | A | 8/1999 | Evoy |
| 5,980,384 | A | 11/1999 | Barrie |
| 6,015,346 | A | 1/2000 | Bennett |
| 6,027,115 | A | 2/2000 | Griswold et al. |
| 6,062,979 | A | 5/2000 | Inoue |
| 6,084,169 | A | 7/2000 | Hasegawa et al. |
| 6,089,976 | A | 7/2000 | Schneider et al. |
| 6,103,964 | A | 8/2000 | Kay |
| 6,106,393 | A | 8/2000 | Sunaga et al. |
| 6,110,041 | A | 8/2000 | Walker et al. |
| 6,110,043 | A | 8/2000 | Olsen |
| 6,113,495 | A | 9/2000 | Walker et al. |
| 6,126,165 | A | 10/2000 | Sakamoto |
| 6,138,273 | A | 10/2000 | Sturges |
| 6,142,875 | A | 11/2000 | Kodachi et al. |
| 6,155,925 | A | 12/2000 | Giobbi et al. |
| 6,159,096 | A | 12/2000 | Yoseloff |
| 6,162,122 | A | 12/2000 | Acres et al. |
| 6,174,233 | B1 | 1/2001 | Sunaga et al. |
| 6,174,235 | B1 | 1/2001 | Walker et al. |
| 6,175,632 | B1 | 1/2001 | Marx |
| 6,186,893 | B1 | 2/2001 | Walker et al. |
| 6,198,395 | B1 | 3/2001 | Sussman |
| 6,217,448 | B1 | 4/2001 | Olsen |
| 6,227,971 | B1 | 5/2001 | Weiss |
| 6,233,731 | B1 | 5/2001 | Bond et al. |
| 6,234,896 | B1 | 5/2001 | Walker et al. |
| 6,238,288 | B1 | 5/2001 | Walker et al. |
| 6,241,612 | B1 | 6/2001 | Heredia |
| 6,254,481 | B1 | 7/2001 | Jaffe |
| 6,257,981 | B1 | 7/2001 | Acres et al. |
| 6,270,411 | B1 | 8/2001 | Gura et al. |
| 6,290,600 | B1 | 9/2001 | Glasson |
| 6,293,866 | B1 | 9/2001 | Walker et al. |
| 6,293,869 | B1 | 9/2001 | Kwan et al. |
| 6,295,638 | B1 | 9/2001 | Brown et al. |
| 6,302,790 | B1 | 10/2001 | Brossard |
| 6,306,034 | B1 | 10/2001 | Sakamoto et al. |
| 6,309,301 | B1 | 10/2001 | Sano |
| 6,319,125 | B1 | 11/2001 | Acres |
| 6,328,648 | B1 | 12/2001 | Walker et al. |
| 6,364,768 | B1 | 4/2002 | Acres et al. |
| 6,375,567 | B1 | 4/2002 | Acres |
| 6,375,568 | B1 | 4/2002 | Roffman et al. |
| 6,375,569 | B1 | 4/2002 | Acres |
| 6,390,923 | B1 | 5/2002 | Yoshitomi et al. |
| 6,428,412 | B1 | 8/2002 | Anderson et al. |
| 6,500,068 | B2 | 12/2002 | Walker et al. |
| 6,504,089 | B1 | 1/2003 | Negishi et al. |
| 6,504,990 | B1 | 1/2003 | Abecassis |
| 6,511,375 | B1 | 1/2003 | Kaminkow |
| 6,516,466 | B1 | 2/2003 | Jackson |
| 6,533,658 | B1 | 3/2003 | Walker et al. |
| 6,537,152 | B2 | 3/2003 | Seelig et al. |
| 6,544,122 | B2 | 4/2003 | Araki et al. |
| 6,554,703 | B1 | 4/2003 | Bussick et al. |
| 6,561,908 | B1 | 5/2003 | Hoke |
| 6,565,434 | B1 | 5/2003 | Acres |
| 6,582,310 | B1 | 6/2003 | Walker et al. |
| 6,592,457 | B1 | 7/2003 | Frohm et al. |
| 6,599,195 | B1 | 7/2003 | Araki et al. |
| 6,626,758 | B1 * | 9/2003 | Parham et al. .................. 463/25 |
| 6,628,939 | B2 | 9/2003 | Paulsen |
| 6,638,169 | B2 | 10/2003 | Wilder et al. |
| 6,645,074 | B2 | 11/2003 | Thomas et al. |
| 6,656,046 | B1 | 12/2003 | Yoseloff et al. |
| 6,682,073 | B2 | 1/2004 | Bryant et al. |
| 6,719,631 | B1 | 4/2004 | Tulley et al. |
| 6,731,313 | B1 | 5/2004 | Kaminkow |
| 6,733,386 | B2 | 5/2004 | Cuddy et al. |
| 6,739,973 | B1 | 5/2004 | Lucchesi et al. |
| 6,746,327 | B2 | 6/2004 | Frohm et al. |
| 6,755,738 | B2 | 6/2004 | Glasson et al. |
| 6,769,983 | B2 | 8/2004 | Slomiany |
| 6,769,985 | B1 | 8/2004 | Laakso et al. |
| 6,780,107 | B2 | 8/2004 | Baerlocher et al. |
| 6,810,517 | B2 | 10/2004 | Bond et al. |
| 6,817,944 | B2 | 11/2004 | Kaminkow |
| 6,835,132 | B2 | 12/2004 | Bennett |
| 6,843,723 | B2 | 1/2005 | Joshi |
| 6,848,996 | B2 | 2/2005 | Hecht et al. |
| 6,890,256 | B2 | 5/2005 | Walker et al. |
| 6,893,341 | B2 | 5/2005 | Walker et al. |
| 6,896,618 | B2 | 5/2005 | Benoy et al. |
| 6,939,223 | B1 | 9/2005 | Jones |
| 6,939,226 | B1 | 9/2005 | Joshi |
| 6,942,574 | B1 | 9/2005 | LeMay et al. |
| 6,958,013 | B2 | 10/2005 | Minereau et al. |
| 6,960,136 | B2 | 11/2005 | Joshi et al. |
| 6,974,385 | B2 | 12/2005 | Joshi et al. |
| 6,991,543 | B2 | 1/2006 | Joshi |
| 7,003,726 | B2 | 2/2006 | Walker et al. |
| 7,004,834 | B2 | 2/2006 | Walker et al. |
| 7,033,276 | B2 | 4/2006 | Walker et al. |
| 7,037,191 | B2 | 5/2006 | Rodgers et al. |
| 7,040,984 | B2 | 5/2006 | Mead |
| 7,056,214 | B2 | 6/2006 | Minereau et al. |
| 7,104,888 | B2 | 9/2006 | Minereau et al. |
| 7,105,736 | B2 | 9/2006 | Laakso |
| 7,112,138 | B2 | 9/2006 | Hedrick et al. |
| 7,118,479 | B2 | 10/2006 | D'Amico et al. |
| 7,121,942 | B2 | 10/2006 | Baerlocher |
| 7,137,887 | B2 | 11/2006 | Gomez et al. |
| 7,137,893 | B2 | 11/2006 | Canterbury |
| 7,156,738 | B2 | 1/2007 | Rowe |
| 7,160,186 | B2 | 1/2007 | Cuddy et al. |
| 7,169,052 | B2 | 1/2007 | Beaulieu |
| 7,172,506 | B2 | 2/2007 | Baerlocher et al. |
| 7,190,572 | B2 | 3/2007 | Maeda |
| 7,198,571 | B2 | 4/2007 | LeMay et al. |
| 7,198,572 | B2 | 4/2007 | Walker et al. |
| 7,241,219 | B2 | 7/2007 | Walker et al. |
| 7,258,613 | B2 | 8/2007 | Lucchesi et al. |
| 7,303,469 | B2 | 12/2007 | Kaminkow |
| 7,371,169 | B2 * | 5/2008 | Baerlocher ..................... 463/20 |
| 2001/0029542 | A1 | 10/2001 | Nishimura |
| 2002/0039919 | A1 | 4/2002 | Joshi et al. |
| 2002/0090990 | A1 | 7/2002 | Joshi et al. |
| 2002/0142825 | A1 | 10/2002 | Lark et al. |
| 2002/0142846 | A1 | 10/2002 | Paulsen |
| 2003/0036424 | A1 | 2/2003 | Baerlocher et al. |
| 2003/0064801 | A1 | 4/2003 | Breckner et al. |

| | | | | |
|---|---|---|---|---|
| 2003/0073490 | A1 | 4/2003 | Hecht et al. | |
| 2003/0073491 | A1 | 4/2003 | Hecht et al. | |
| 2003/0078103 | A1 | 4/2003 | LeMay et al. | |
| 2004/0023707 | A1 | 2/2004 | Maya et al. | |
| 2004/0048657 | A1 | 3/2004 | Gauselmann | |
| 2004/0053660 | A1 | 3/2004 | Webb et al. | |
| 2004/0053665 | A1 | 3/2004 | Baerlocher | |
| 2004/0053695 | A1 | 3/2004 | Mattice et al. | |
| 2004/0063489 | A1 | 4/2004 | Crumby | |
| 2004/0082374 | A1 | 4/2004 | Maya et al. | |
| 2004/0082378 | A1 | 4/2004 | Peterson et al. | |
| 2004/0127277 | A1 * | 7/2004 | Walker et al. | 463/16 |
| 2004/0127284 | A1 | 7/2004 | Walker et al. | |
| 2004/0142739 | A1 | 7/2004 | Loose et al. | |
| 2004/0142747 | A1 | 7/2004 | Pryzby | |
| 2004/0198489 | A1 | 10/2004 | Kaminkow et al. | |
| 2004/0209685 | A1 | 10/2004 | Lucchesi et al. | |
| 2004/0242315 | A1 | 12/2004 | Paulsen | |
| 2004/0248639 | A1 | 12/2004 | Slomiany | |
| 2005/0043090 | A1 | 2/2005 | Pryzby et al. | |
| 2005/0045025 | A1 * | 3/2005 | Wells et al. | 84/615 |
| 2005/0054440 | A1 | 3/2005 | Anderson et al. | |
| 2005/0054441 | A1 | 3/2005 | Landrum et al. | |
| 2005/0054442 | A1 | 3/2005 | Anderson et al. | |
| 2005/0064935 | A1 | 3/2005 | Blanco | |
| 2005/0071023 | A1 | 3/2005 | Gilliland et al. | |
| 2005/0096121 | A1 | 5/2005 | Gilliland et al. | |
| 2005/0096123 | A1 | 5/2005 | Cregan et al. | |
| 2005/0159218 | A1 | 7/2005 | Blanco | |
| 2005/0164785 | A1 | 7/2005 | Connelly | |
| 2005/0197180 | A1 | 9/2005 | Kaminkow et al. | |
| 2005/0233800 | A1 | 10/2005 | Jones | |
| 2005/0277469 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0025196 | A1 | 2/2006 | Webb et al. | |
| 2006/0046829 | A1 | 3/2006 | White | |
| 2006/0246977 | A1 | 11/2006 | Cannon | |
| 2006/0247039 | A1 | 11/2006 | Lerner et al. | |
| 2007/0006708 | A1 | 1/2007 | Laakso | |
| 2007/0032285 | A1 | 2/2007 | Wolf | |
| 2007/0111783 | A1 | 5/2007 | Cuddy et al. | |
| 2007/0117606 | A1 | 5/2007 | Baerlocher et al. | |
| 2007/0173307 | A1 | 7/2007 | Aida | |
| 2007/0243930 | A1 * | 10/2007 | Zalewski et al. | 463/35 |
| 2007/0293304 | A1 | 12/2007 | Loose et al. | |
| 2008/0032787 | A1 * | 2/2008 | Low et al. | 463/29 |
| 2008/0076548 | A1 | 3/2008 | Paulsen | |

FOREIGN PATENT DOCUMENTS

| | | |
|---|---|---|
| JP | 2000107466 | 4/2000 |
| WO | WO 2004/014501 | 2/2004 |
| WO | WO 2005/113089 | 12/2005 |
| WO | WO 2005/114598 | 12/2005 |

OTHER PUBLICATIONS

Banana-Rama Brochure, published by Silicon Gaming, available prior to Oct. 24, 2006.

Elephant King Advertisement, [online] [retrieved Mar. 21, 2001]. Retrieved from the Internet at <URL: http://www.igt.com>.

Elephant King Advertisement, written by IGT, published in Oct. 1999.

Fortune Cookie Advertisement, written by IGT, published in 2000.

Fortune Cookie Advertisement [online] [retrieved on Mar. 21, 2001]. Retrieved from the Internet at <URL: http://www.igt.com>.

Frankie & Annette's Beach Party Article, written by Strictly Slots, published in Dec. 2001.

Frankie & Annette's Beach Party (EVO Hybrid) Advertisement [online] [retrieved on Jan. 9, 2004]. Retrieved from the Internet at <URL: http://www.ballygaming.com>.

IGT Gaming Systems Brochure, written by IGT, published in 2002.

Jackpot Party Brochures and Articles, written by WMS Gaming, Inc., published in 1998.

Jazzy Jackpots Article written by Strictly Slots, published in Mar. 2001.

Musical Cherries Advertisement, written by Acres Gaming, Inc., published in 2000.

Power Bonusing—Bonusing Solutions Without Limits Bally iVIEW Advertisement, written by Bally Gaming Systems, published in 2005.

Power Bonusing—Power Winners CMP Product Group, written by Bally Gaming Systems, published in 2006.

Power Bonusing—Power Winners ACSC Product Group, written by Bally Gaming Systems, published in 2006.

PromoPAK Advertisement, written by International Game Technology, published in 2003.

Slots 2003 Article, written by Strictly Slots, published in Jan. 2003.

* cited by examiner

GAMING SYSTEM AND METHOD HAVING PROMOTIONS BASED ON PLAYER SELECTED GAMING ENVIRONMENT PREFERENCES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming establishments have recognized the value of building customer loyalty through identifying frequent customers and rewarding them for their patronage. These rewards are typically referred to as comping or promotions. To properly identify customers that are deserving of special comp rewards, automated player tracking technologies exist to accurately identify these individuals. Each particular player's gaming activity enables gaming establishments to target which individual players deserve to receive promotions or comps. A player tracking system typically includes one or more devices which track and store information regarding one or more aspects of a player's gaming activity. Such systems include issuing individual player tracking cards to one or more players, wherein each time a player participates in a qualified gaming activity, the gaming system associates and stores the player's gaming activity with the player's player tracking account. Based on this stored information or data, the gaming establishment classifies each player and provides one or more of such players certain benefits based on these classifications and their gaming activity.

In existing player tracking systems, a player is issued a player identification card which has an encoded player identification number that uniquely identifies the player. Player tracking on gaming devices, such as slot machines, is frequently accomplished with a card reader mounted in the gaming device. When the player first sits down at a gaming machine, the player inserts the card into the card reader. The card reader reads the player identification number from the card and communicates information through a network to a central computer regarding the player's subsequent gaming activity until the player cashes out or removes their card.

Certain casinos try to make promotions or comps more personal. One known way certain casinos try to personalize promotions is by providing an optional survey for players to fill out upon registration for a player tracking program. However, players often neglect to fill out the survey because it is burdensome. Other players are not aware that the survey exists. Casinos and players also have an interest in a player using the time necessary to fill out the survey to participate in other activities. For example, the player may want to play games or make other use of their leisure or pleasure time.

Additionally, many surveys do not ask the right questions or enough questions to have a level of detail to provide the player promotions based on the surveys. The players that actually fill out the surveys only fill them out at the time of registering for player programs. The casinos do not update the surveys and player's tastes or preferences often change.

Casinos incur costs in providing or sending out promotional materials to players. The players that receive the promotions need to be targeted to ensure they are of the player group that would possibly use the promotions. Even so, many promotions go unredeemed by players. To provide better promotions to the players which may use or benefit from the promotions, more and better information is needed than the information currently provided by the known systems. For example, more detailed information is needed to perform regression analysis to determine which players to provide which promotions.

It is thus very desirable for a gaming establishment to be able to determine which customers to provide with personalized comps, promotions and incentives.

SUMMARY

The present disclosure provides a gaming system and method including a tracking system or a player tracking system and plurality of gaming machines. Each of the gaming machines includes at least one display device, at least one input device, and a plurality of player preference selections or choices displayable by the display device. The gaming machine enables the player to enter identification information at the gaming machine and enables the player to choose at least one of the preference selections. These player preference selections enable a player to choose one or more elements of the background or an entertainment setting of the gaming machine while they are playing at the gaming machine. The gaming machine and/or system tracks data of or relating to all of the preference selections made by the player. That is, the gaming machine and/or system monitors and stores data regarding the player's preferences. In one embodiment, upon the player's tracking account meeting certain promotional criteria, the gaming machine and/or system makes a determination using the data stored regarding the player's preferences to determine a promotion, prize or comp to provide the player. This determination is at least in part based on the preference selections chosen by that player. That is, in one embodiment, the player does not directly determine which promotions to receive. Rather, the player makes preference selections without selecting the promotions, comps or incentives the player would like to receive or is interested in; and the gaming system extrapolates from these player preferences what comps, promotions and/or incentives the player would be interested in. The gaming system records data from the player's preferences and determines promotions based from this data. The promotions provided to a player are therefore personalized based on information collected by the gaming system from the selections made by that player about their gaming environment. A very simple example of this is that the player picks a picture of food to be the background screen or game symbols for a video slot game the player is playing and the gaming system determines to provide a comp to the player in the form of a restaurant voucher instead of in the form of tickets to a show. Thus, this promotion determination is based on a gaming environment choice by the player.

In various embodiments, the gaming system and/or machine is associated with or otherwise integrated with one or more player tracking systems. In these embodiments, the gaming machine and/or player tracking system tracks player gaming activity at the gaming machine. In one such embodiment, the gaming machine and/or associated player tracking system timely tracks when a player begins a gaming session, for example by inserting their player tracking card, and also timely tracks when a player concludes a gaming session, such as by removing their player tracking card or cashing out. It should be appreciated that players may identify themselves at the gaming machines in any other suitable manner. In one embodiment, the gaming machine and system utilizes one or more portable devices carried by a player, such as a cell phone, a radio frequency identification tag or any other suitable wireless device to track when a player begins and ends a gaming session. In another embodiment, the gaming machine utilizes any suitable biometric technology or ticket technology to track when a player begins and ends a gaming session. In one embodiment, the player enters an identification number or code at the beginning of a gaming session.

During one or more gaming sessions, the gaming machine and/or player tracking system enables the player to select preference selections and play games. During the gaming session, the gaming machine and/or player tracking system tracks any suitable information, such as any amounts wagered, the player's selected preferences, data from the player's selected preferences for the gaming environment, the average wager amounts and/or the time these wagers are placed. The gaming system determines when a player deserves or wins a promotion based on player tracking data, such as the amounts wagered or obtaining a certain number of player points. The gaming system then determines which promotion to provide to the player based, at least in part, on the stored preferences of that player.

For example, in one embodiment, the gaming system includes a plurality of gaming machines that each includes at least one game and at least one display device. Upon an occurrence of a triggering event, such as a player placing a wager at one of the gaming machines, the gaming machine provides the player with one or more preference selections and enables the player to choose one of the preference selections. In one example, the preferences are different types of music that the player may listen to while playing the gaming machine. The gaming machine and/or system enacts the player's chosen preference and stores data relating to the specific preference. For example, the gaming machine and/or system may store that the player chooses to listen to music or chooses not to listen to music. In another example, the gaming machine and/or system may store the type of music and/or the artist that the player selects, or other such relevant information. The gaming machine and/or system passively tracks information about the player obtained through their player preferences. For example, the preferences provided to the player are different types of music and the player chooses rap music. When a player's account meets certain player promotion criteria, the gaming machine and/or system determines a promotion or comp to provide to the player. In a simple example, the gaming system may provide the player tickets to a rap-concert based on the player's music selection. The player does not choose to receive the rap concert tickets. Rather, the gaming system makes a deduction, an inference, or extrapolation that the player would enjoy a rap concert based on data passively collected from the preferences of the player.

It should be appreciated that the selection of the comp, promotion or incentive can be based on much more complicated analysis of the preference selections by the player and in particular on data stored from multiple different player preference selections. It should be appreciated that the determination of the comp, promotion or incentive may be based on any suitable number and combination of data collected from the player preferences from any suitable number of player preference categories. For example, the determination of which promotion to provide to the player may be based on the data collected from five player preference selections on different gaming environment choices such as music, symbol preference, game preference, denomination preference, and secondary entertainment preference. In certain embodiments, the gaming system may determine the promotion to provide to the player based on only one preference category but may use a complicated analysis of data stored about what the player selected and what the player did not select in that category to determine the promotion to provide the player.

In another embodiment, a gaming machine includes at least one display device which includes at least one secondary display, or entertainment or secondary content display. The gaming machine and/or system provides a plurality of preferences to the player and enables the player to select one or more of the preferences. In one embodiment, the preferences relate to entertainment content for the player to view on the secondary display such as music videos, movies, sporting events, movie trailers or television shows. The gaming machine displays the entertainment content made by the player on the secondary display while the player is playing one or more games on the gaming machine. The player directly chooses what type of content or program to watch. Upon the player's account meeting one or more player promotion criteria, the gaming machine and/or system determines one or more promotions to provide the player based on the player's choices or preferences. In a simple example, if the player frequently chooses to watch sports programs, the gaming machine and/or system may determine to provide the player tickets to a sporting event.

It should be appreciated that the gaming machine and/or system may provide the player with any suitable preferences. The preferences may provide auditory output, visual output or audio-visual output. The categories of the preferences may be any suitable category such as music, music videos, television, sporting events, food-themed choices, concert clips, television shows, movie trailers, or any other suitable entertainment selections.

It should be appreciated the gaming machine and/or system may base the determination of which promotion to provide the player on any suitable preference criterion, preference conditions or combinations thereof. In one embodiment, the gaming machine and/or system determines which promotion to provide the player based, at least in part, on the subject matter of the preference most selected by the player. That is, the gaming machine and/or system stores certain data about the player's choices. In one embodiment, upon an occurrence of a predetermined promotion criteria being filled by the player or the player's account, the gaming system provides the player a promotion based on the data collected from the player's preferences. For example, if the player chooses preferences related to country music the most often, the gaming machine and/or system provides the player a promotion associated with country music. In one embodiment, if the player's account meets a preference condition, upon an occurrence of a predetermined promotion criteria being filled by the player's account, the gaming system provides the player a promotion based, at least in part, on the data collected from the player's preferences. That is, in one embodiment, if the player does not meet one or more the preference conditions, upon an occurrence of a predetermined promotion criteria being filled by the player, the gaming system provides the player a promotion not based on the data collected from the player's preferences. For example, the preference conditions include a player selection of a subject matter a certain number of times. The gaming machine and/or system only provides the player a promotion based on the preferences if the player has selected a subject matter of the preferences a certain number of times. For example, a player must select a subject matter at least twenty times to receive a promotion associated with that subject matter. If the player does not meet the preference condition but meets the promotion criteria, the gaming machine and/or system provides the player a general promotion not based on the player's preferences. In one embodiment, the gaming machine and/or system bases the promotion on the categories of selections chosen by the player. For example, if the player frequently selects to watch television programs, the gaming machine and/or system provides the player with an award in the form of a television.

It should be appreciated that the criterion for winning a promotion may be any suitable criterion. In one embodiment, the player tracking system accumulates player points based on game events, such as the amount wagered or the coin-in for the player. The criteria for winning a promotion are based on the player accumulating a certain number of player points by wagering or other suitable activity. The gaming machine and/or system may provide the player promotions based alternatively or additionally on any suitable information of the player, such as on the player's anniversary or birthday. Additionally, the gaming machine and/or system may provide the player a comp or promotion based, at least in part, on criteria unrelated to the player, such as the number of gaming machines being played in a gaming establishment.

The promotions, comps or prizes provided to the player may be any suitable promotion, comp or prize, including but not limited to: (a) event tickets, (b) gift certificates or other suitable certificates, (c) entrance tickets, (d) physical items such as a DVD, (e) vacations or trips, (f) plane tickets, or (g) any combination of the above.

In one embodiment, the gaming machine and/or system alters or modifies one or more aspects of the game based (such as the primary game or a secondary game) on player preferences. That is, the gaming machine and/or system determines one or more game modifications based, at least in part, on the player's preferences. For example, if the player's preferences indicate that the player enjoys music, a guitar symbol may be added to the symbols of the game. It should be appreciated that the gaming machine and/or gaming system may modify any suitable aspect of the game based on player preferences in any suitable manner. In one embodiment, the gaming machine and/or system themes a bonus game based on the player's preferences. For example, if the player chooses preferences that relate to sporting events and the player triggers a bonus game, one or more aspects of the bonus game are related to sports. In another embodiment, the gaming machine and/or system changes a plurality of aspects of a game or bonus game based on data collected from player preferences. For example, the gaming system determines from data stored relating to the player preferences that the player enjoys sporting events and rock and roll. The gaming machine and/or system may theme an aspect of the game, such as the symbols based on the sporting event interest and another aspect of the game, such as the music, based on the rock and roll interest. In another embodiment, a whole game or bonus game is themed after the data received from the player preferences.

It should be appreciated that the preference selections may be any suitable preference selections, including but not limited to: (i) sounds, such as music or sounds associated with one or more games; (ii) visual game selections such as background, foreground or game play and/or (iii) audio-visual selections such as movies, sporting events, television shows, resort videos, gambling shows. It should also be appreciated that the gaming machine and/or system may enable the player to select any suitable number of preference selections.

The present disclosure may be implemented in various configurations for gaming machines to implement the preferences of the players. In one embodiment, the computerized instructions for controlling any games and/or controlling or enacting the preferences of the player are executed by a central server, central controller or remote host. In one such "thin client" embodiment, the central server remotely controls the enactment of the preferences and the gaming machine is utilized to display such games and receive one or more inputs or commands from a player. In one embodiment, the central server is operable with the player tracking system to match information to a player's account.

In another embodiment, the computerized instructions for controlling any games and/or the preferences are communicated from the central server, central controller or remote host to a gaming machine local processor and memory devices. In one such "thick client" embodiment, the gaming machine local processor executes the communicated computerized instructions to control any games and the enactment of preferences provided to a player. In one such embodiment, the gaming machine stores the player's preference and the gaming activity and communicates the player preferences and game outcome to a central server which routes the information to the correct location, such as a player account. In another such embodiment, the gaming machine communicates the player's preference information to the central server separately from any gaming activity.

In one embodiment, one or more gaming devices in a gaming system may be thin client gaming machines and one or more gaming machines in the gaming system may be thick client gaming devices. In another embodiment, certain functions of the gaming machine are implemented in a thin client environment and certain other functions of the gaming device are implemented in a thick client environment. In one such embodiment, computerized instructions for controlling any games are communicated from the central server to the gaming machine in a thick client configuration and computerized instructions for controlling the enactment of the player preferences are executed by a central server in a thin client configuration. In another such embodiment, computerized instructions for controlling the enactment of any preferences are communicated from the central server to the gaming machine in a thick client configuration and computerized instructions for any games are executed by a central server in a thin client configuration. It should be appreciated that the gaming system may enact the player's preferences and enable the player to play one or more games in any suitable manner.

It should be appreciated that the player preferences may be displayed or offered to the player in any suitable manner. In one embodiment, the gaming machine includes a secondary display where visual preferences are displayed. In one such embodiment, the player's preference is displayed individually on a display device. In another embodiment, the preference is displayed on a secondary display of a display device also displaying other content. For example, the preference is displayed picture in picture on the same display device which displays the game. In another embodiment, the gaming machine does not display information about the preferences but the gaming system communicates the choices to the player in another method. For example, the preference selections include different types of music to listen to and the gaming machine includes a music generator such as a tuner. The common display devices and signs display which radio stations or frequency stations include which kind of music. For example, the signs may display "tune the tuner to 1 to listen to sports updates, tune the tuner to 2 to listen to classical and tune the tuner to 3 to listen to rock." In one such embodiment, the individual gaming machines never display information about the preference selections.

It should also be appreciated that the gaming machine and/or the gaming system may enable the player to listen to any audio components of preference selections in any suitable manner. In one embodiment, the gaming machine and/or system includes speakers which play any audio components. In another embodiment, a gaming machine includes headphones and enables the player to listen to the audio components through the headphones. It should thus be appreciated that the present disclosure provides a method of indirectly obtaining player preference information through player preference selections without requiring direct information about a player's comp choices, such as by requiring a player to complete a player survey to obtain such information.

Additional features and advantages are described herein, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
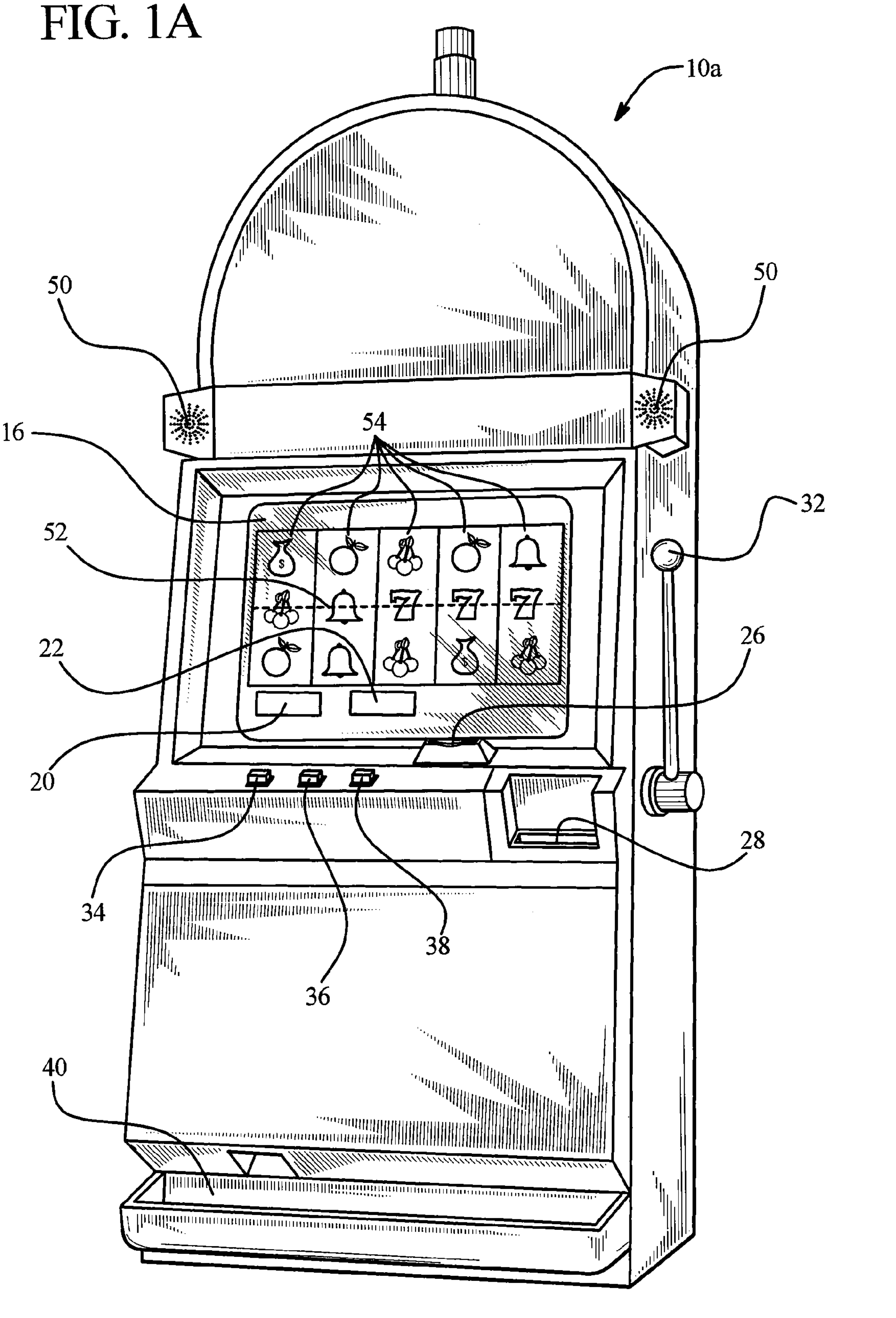
FIGS. 1A and 1B are perspective views of alternative embodiments of the gaming devices of the disclosed gaming system.
Figure 1B:
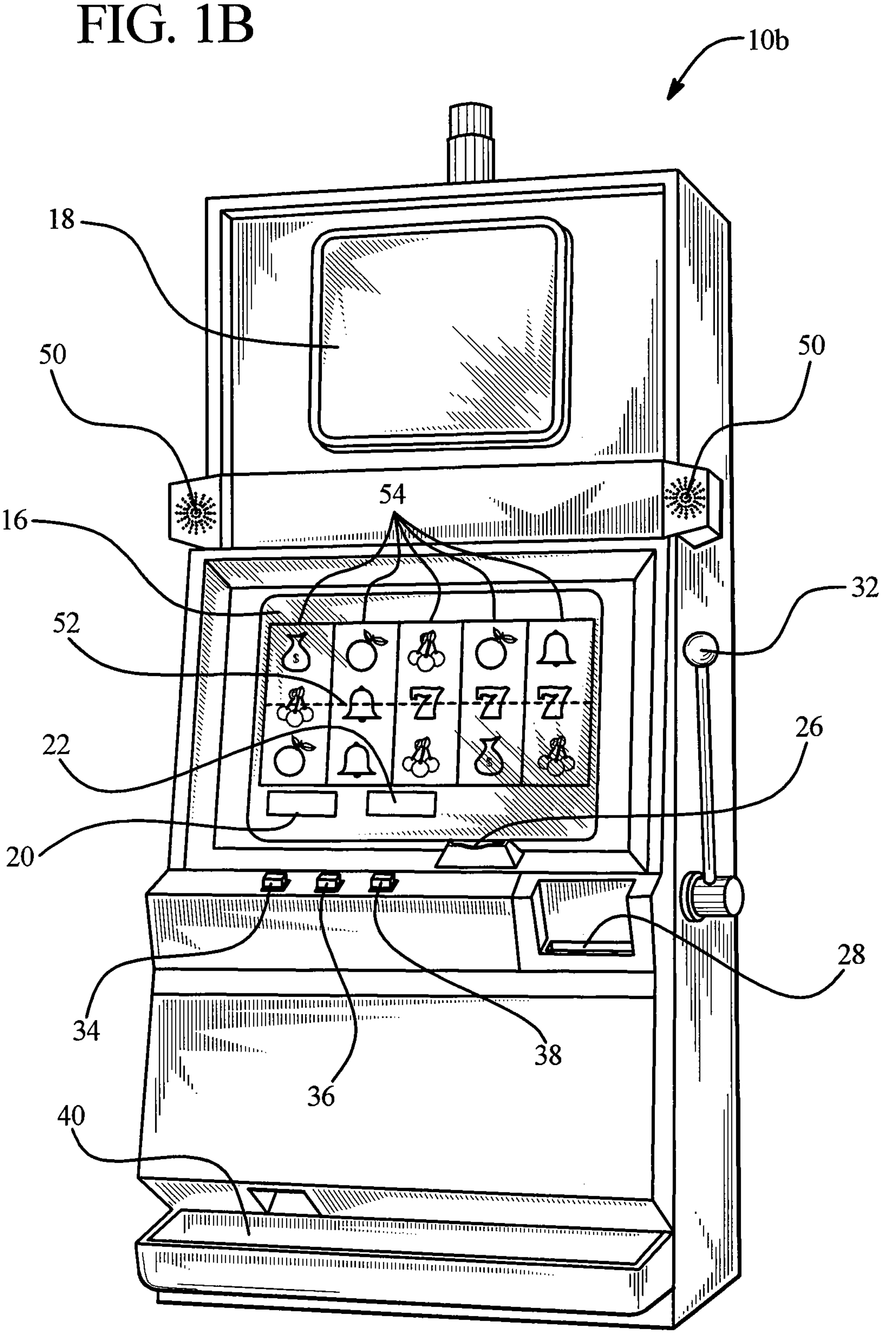

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
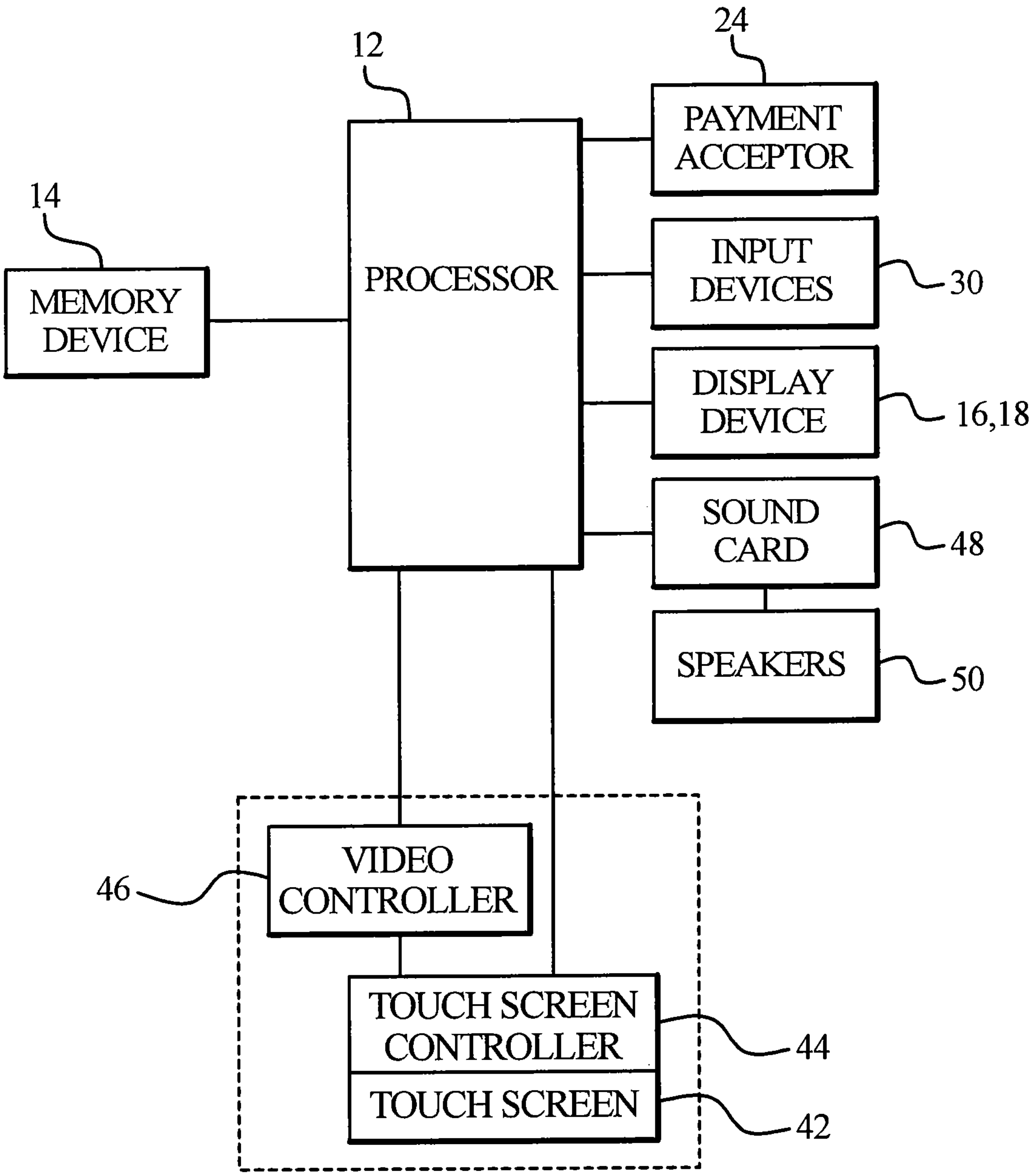
FIG. 2A is a schematic block diagram of an electronic configuration of one embodiment of the disclosed gaming system.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, paytable data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel x I symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
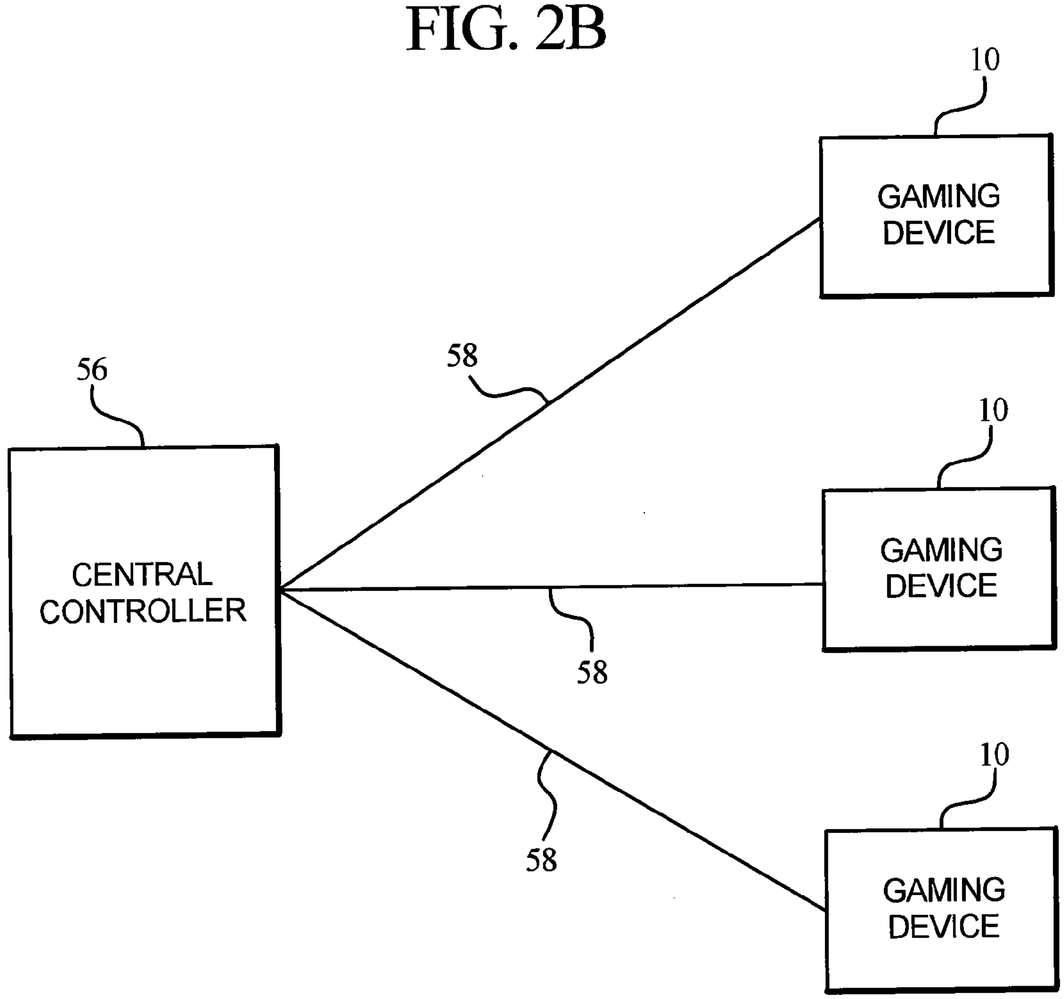
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the interneVintranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Promotions Based on Player Preferences

In one embodiment, the gaming system and/or machine disclosed herein is associated with or otherwise integrated with one or more player tracking systems. In this embodiment, the gaming machine and/or player tracking system tracks player gaming activity or preference activity at the gaming machine. In one such embodiment, the gaming machine and/or associated player tracking system timely tracks when a player inserts their player tracking card to begin a gaming session and also timely tracks when a player removes their player tracking card when concluding play for that gaming session. In another embodiment, rather than requiring a player to insert a player tracking card, the gaming machine and system utilizes one or more portable devices carried by a player, such as a cell phone, a radio frequency identification tag or any other suitable wireless device to track when a player begins and ends a gaming session. In another embodiment, the gaming machine utilizes any suitable biometric technology or ticket technology to track when a player begins and ends a gaming session. In one embodiment, the player enters an identification number or code at the beginning of a gaming session. It should be appreciated that players may be identified and tracked in any suitable manner.

During one or more gaming sessions, the gaming machine and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, the gaming machine and/or system determines whether to provide a player a comp, promotion or award based, at least in part, on the player's stored data.

Additionally, the player tracking system, gaming system or gaming machine tracks a player's data based on the preferences or background or entertainment choices. The gaming system then uses that player's data preference information to extrapolate which comp, promotion or prize to provide the player. In one embodiment, the data includes all of the information about the chosen preference selection. In another embodiment, the data includes limited information about the chosen preference selection.

Figure 3:
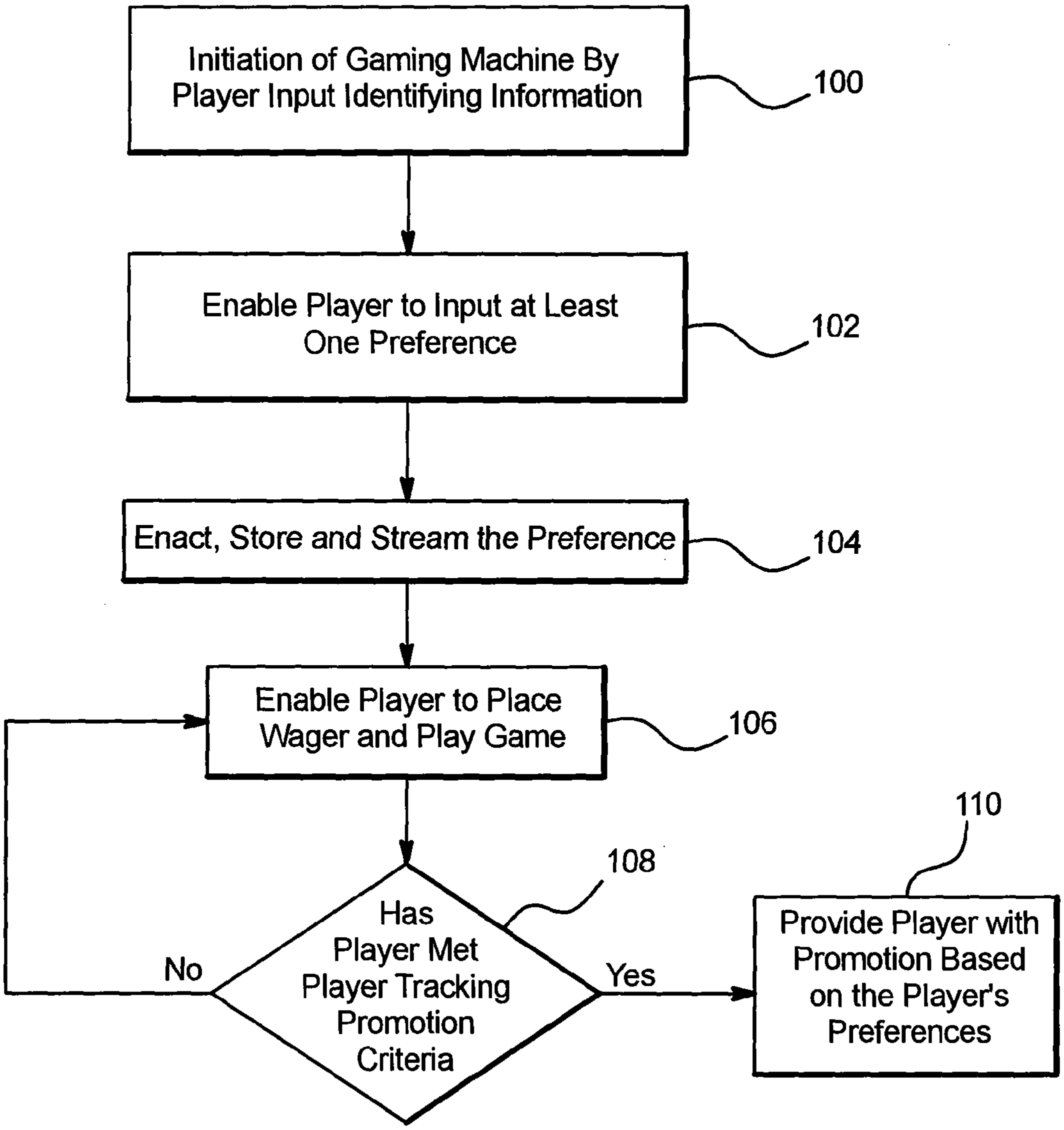
FIG. 3 is flow chart illustrating one embodiment of the present disclosure where the gaming machine and/or gaming system determines a promotion to provide the player based, at least in part, on preferences of the player.

As illustrated in FIG. 3, in one embodiment, the gaming machine or system enables the player to initiate the gaming machine by inputting identification information as illustrated in block 100. It should be appreciated that a player may enter identifying information in any suitable manner. In one embodiment, the gaming machine enables the player to insert a player tracking card. In another embodiment, the gaming machine enables the player to enter an account number. In one embodiment, the gaming machine or system enables the player to input one or more player preferences as illustrated in block 102. For example, the gaming machine enables the player to select a type of music to listen to while playing at the gaming machine. The gaming machine or system then enacts, stores and streams the player's preferences as illustrated in block 104. The gaming machine enables the players to place a wager and play a game as illustrated in block 106. The gaming machine or system determines whether the player has met the player tracking promotion triggering event as illustrated in block 108. It should be appreciated that this player tracking promotion criteria or triggering event may be based on any suitable criteria such as but not limited to total coin-in, number of games played, player reward status, length of time played at one gaming machine or gaming establishment, frequency of trips to the gaming establishment or any suitable combination thereof. If the gaming machine or system determines the player has met the promotion criteria, the gaming machine or gaming system provides the player with a promotion based on the player's stored preferences as illustrated in block 110. It should be appreciated that the gaming system may inform the player about the comp, award or the promotion in any suitable manner. In one embodiment, the gaming machine or gaming system instructs the player to go to a cashier or a designated desk to redeem a promotion. In another embodiment, the gaming machine informs the player when they will be eligible to receive a promotion. The gaming machine or gaming system may determine which promotion to provide, based at least in part, on the player's preferences in any suitable manner.

The present disclosure may be implemented in various configurations for gaming machines to implement the preference of the players. In one embodiment, the computerized instructions for controlling any games and/or controlling or enacting the preferences of the player are executed by a central server, central controller or remote host. In one such thin client embodiment, the central server remotely controls the enactment of the preferences and the gaming machine is utilized to display such games and receive one or more inputs or commands from a player. In one such thin client embodiment, the central server retrieves player data, such as a player identification number, from the player tracking system to store the information about the player. In another embodiment, the central server sends the information to the player tracking system and the player tracking system stores the information. In another embodiment, the central server and/or the player tracking system send the information to a customer management system which stores the information.

In another embodiment, the computerized instructions for controlling any games and/or the preferences are communicated from the central server, central controller or remote host to a gaming machine local processor and memory devices. In such a thick client embodiment, the gaming machine local processor executes the communicated computerized instructions to control any games and the enactment of preferences provided to a player. In one such embodiment, the gaming machine stores the player's preference and the gaming activity and communicates the player preferences and game outcome to a central server which routes the information to the correct location, such as a player account. In another such embodiment, the gaming machine communicates the player's preference information to the central server separately from any gaming activity. In one embodiment, the gaming machine prints out the promotion on an award ticket at the gaming machine. In another embodiment, the gaming establishment mails the player the promotion. In another embodiment, the gaming establishment notifies the player, such as by email or a text message about the promotion. In one such embodiment, the player has to return to the gaming establishment within a certain time period to receive the promotion.

In one embodiment, one or more gaming machines in a gaming system may be thin client gaming machines and one or more gaming machines in the gaming system may be thick client gaming machines. In another embodiment, certain functions of the gaming machine are implemented in a thin client environment and certain other functions of the gaming machine are implemented in a thick client environment. In one such embodiment, computerized instructions for controlling any games are communicated from the central server to the gaming machine in a thick client configuration and computerized instructions for controlling the enactment of the player preferences are executed by a central server in a thin client configuration. In another such embodiment, computerized instructions for controlling the enactment of any preferences are communicated from the central server to the gaming machine in a thick client configuration and computerized instructions for any games are executed by a central server in a thin client configuration.

In another such embodiment, computerized instructions for controlling the enactment of certain preferences are communicated from the central server to the gaming machine in a thick client configuration and computerized instructions for certain preferences are executed by a central server in a thin client configuration. For example, all purely audio preferences are communicated from the central server to the gaming machine in a thick client configuration and all audio-visual preferences are executed by a central server in a thin client configuration.

Figure 4:
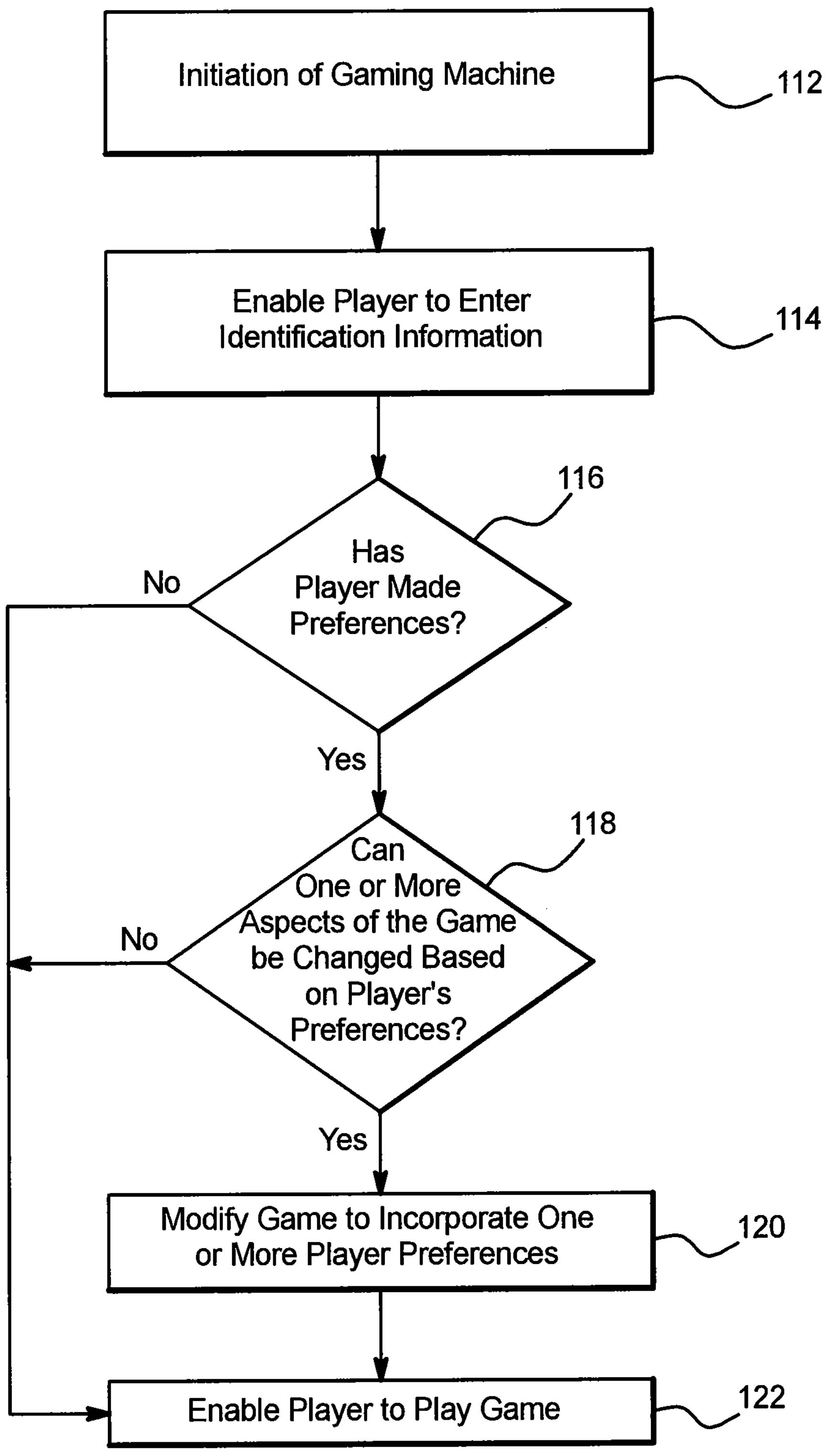
FIG. 4 is flow chart illustrating one embodiment of the present disclosure where the gaming machine and/or gaming system changes one or more aspects of a game based, at least in part, on preferences of the player.

As illustrated in FIG. 4, in an alternative embodiment, the gaming machine or gaming system alters or modifies one or more aspects of the game based on the player's current preference or the player's previous, stored preferences. For example, if the player frequently chooses items related to cars, the gaming machine may use car symbols in a slot game instead of the standard symbols.

As illustrated in FIG. 4, a player initiates a gaming machine as illustrated by block 112. The gaming machine or gaming system enables the player to enter identification information as illustrated in block 114. In one embodiment, the gaming machine or system determines if the player has made preferences as illustrated in diamond 116. If the player has not made preferences, the gaming machine or system enables the player to play the game as illustrated in block 122. If the player has made preferences, the gaming machine or system determines whether to change one or more aspects of the game based on the player's preferences as illustrated in diamond 118. If the gaming machine or system determines not to change one or more aspects of the game based on the player's preferences, the gaming machine enables the player to play the game as illustrated in block 122. If the gaming machine or system determines to change one or more aspects of the game based on the player's preferences, the gaming machine or system modifies the game to incorporate one or more of the player's preferences as illustrated in block 120. The gaming machine or system then enables the player to play the game as illustrated in block 122. It should be appreciated that the gaming machine and/or system may alter or modify the game based on the player's previous preference or selection. In one embodiment, if the gaming machine and/or system determines that the player does not have the required number of previously stored preferences or any stored preferences, the gaming machine and/or system may then present preferences to the player and alter or modify the game based on those preferences.

In another embodiment, prior to enacting a game change, the gaming system enables the player to determine whether to enact the game change. For example, the gaming machine and/or system makes an offer to the player to change the game. In one such embodiment, the gaming machine displays the new game or the new game format. The gaming machine and/or system provides the player the choice to change the game and enables the player to make an input to change the game or for the game to remain the same. The gaming machine and/or system then enacts the player's decision.

It should be appreciated that any suitable aspect of one or more games may be modified based on the player's preferences. For example, the gaming machine or system may substitute a special symbol into the game based on the player's preferences. For example, if the player inputs preferences indicating that the player enjoys baseball, a baseball symbol is as a special symbol in the game. In another embodiment, the gaming machine or gaming system may theme a bonus game based on the player's preferences. In another embodiment, the gaming machine or system presents a background decoration for the game according to the player's preferences. In another embodiment, the gaming machine and/or system determines a custom bonus game based on the data stored based on the player's preferences. For example, the bonus game is a match game with a plurality of symbols. The player's data indicates that the player enjoys sports, therefore, the gaming machine and/or system has the player match sports related symbols, such as baseballs, basketballs, bats, gloves, and helmets. In one embodiment, though the gaming machine and/or system changes one or more aspects or graphics of a game based on the data collected from the player preferences, the math or the paytable and average expected payout for the game remains the same. In another embodiment, the gaming machine or system provides promotions and comps in accordance with the player's preferences in addition to incorporating one or more aspects of the player's preferences into the game.

Figure 5A:
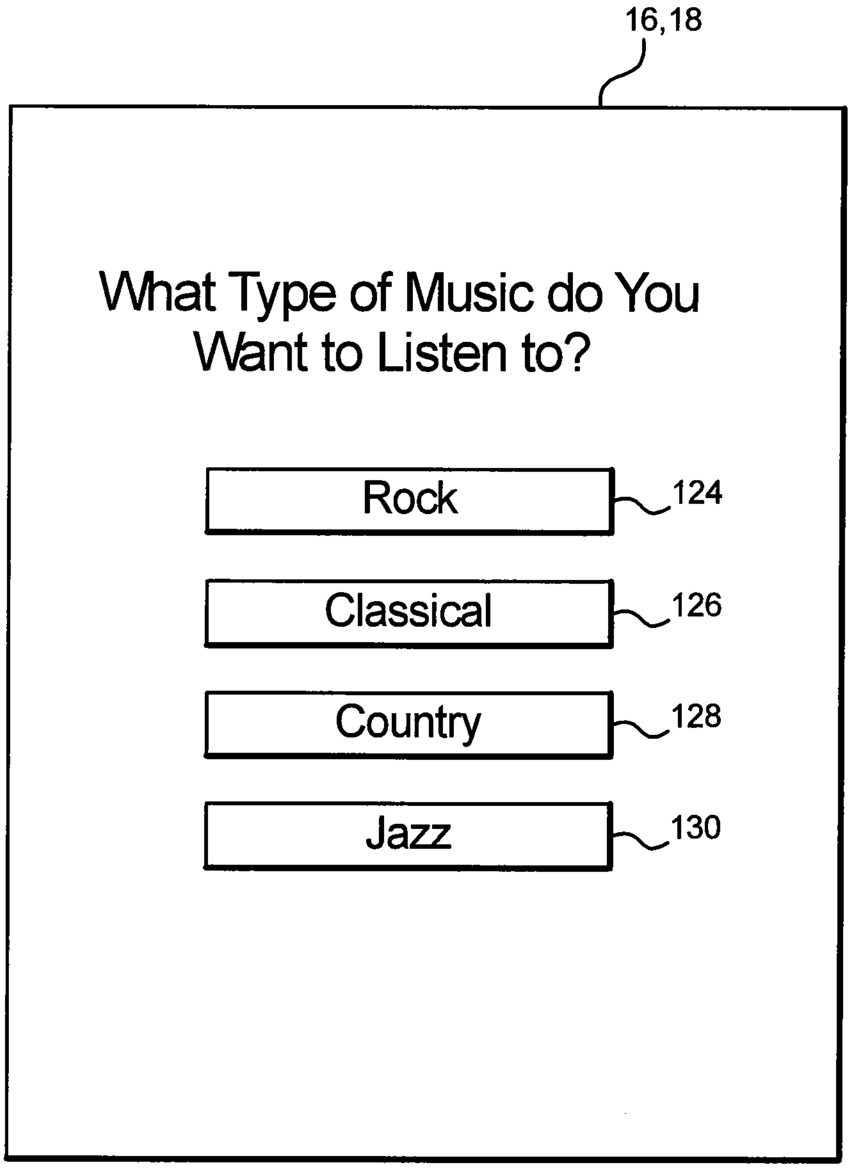
FIGS. 5A, 5B, 5C and 5D are screen shots of a gaming machine enabling a player to select a preference and using that preference to determine a promotion for the player.

As illustrated in FIGS. 5A, 5B, 5C and 5D, in one embodiment, a gaming machine enables a player to input a player preference or entertainment setting or background preference. In the illustrated embodiment, the preference is a choice of background music for the player to listen to while the player is playing at the gaming machine. As illustrated in FIG. 5A, upon initiation of the gaming machine, a display device 16 and 18 of a gaming machine enables a player to make an input on a touch screen to determine which background music to listen to while playing at the gaming machine. It should be appreciated that the gaming machine may enable the player to make the input in any suitable manner. As illustrated in FIG. 5A, in the illustrated embodiment, the gaming machine provides the player with four preference selections or choices: rock music 124, classical music 126, country music 128 and jazz music 130.

Figure 5B:
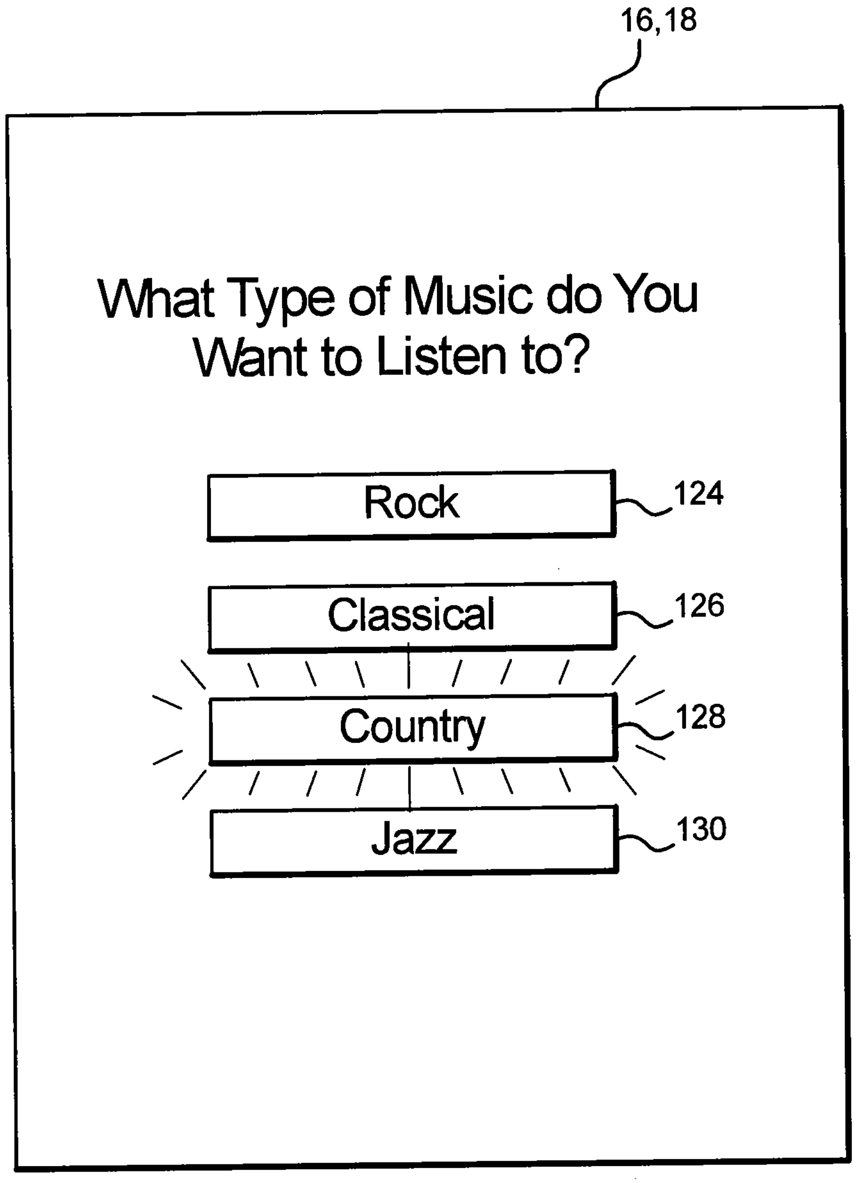

As illustrated in FIG. 5B, a player selects to listen to country music by making an input via the touch screen.

Figure 5C:
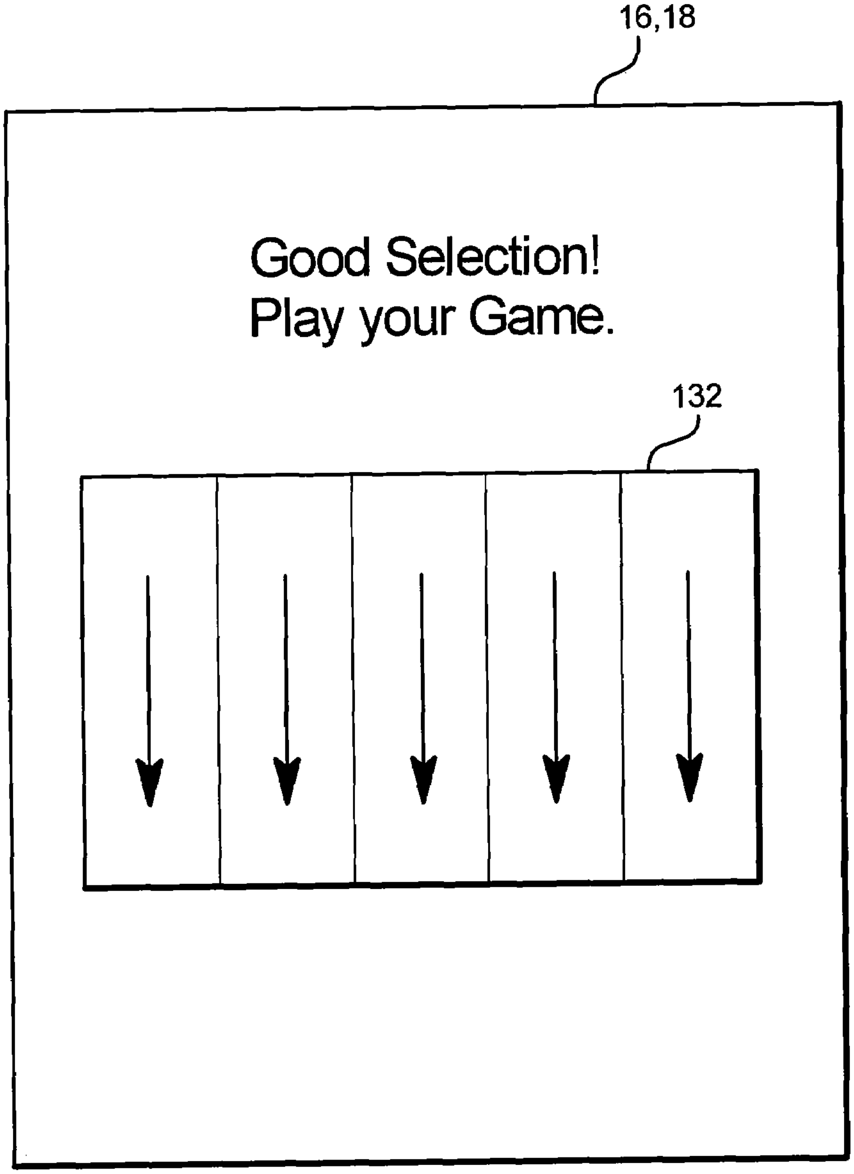

As illustrated in FIG. 5C, the gaming machine enables the player to play a game 132 on the gaming machine while listening to music. In the illustrated embodiment, the game is a slot game though it should be appreciated that the game may be any suitable game. Additionally, the gaming machine may enable the player to play any suitable number of games.

Figure 5D:
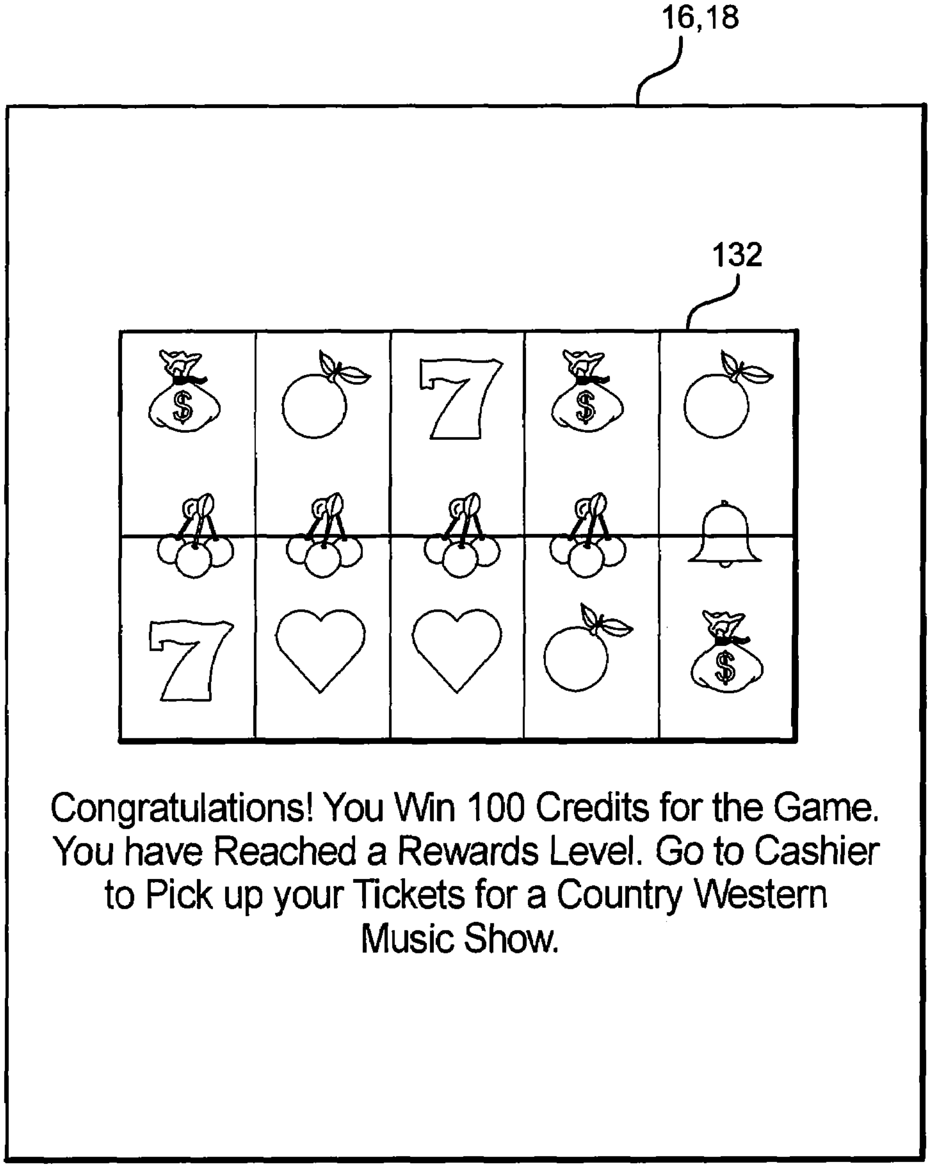

As illustrated in FIG. 5D, the gaming machine generates an outcome for the player which is displayed on the display device. As illustrated in FIG. 5D, the player wins 100 credits in the game for the symbol combination of four cherry symbols on a payline. Additionally, the player wins a pair of concert tickets for a comp or reward for reaching designated promotion criteria, such as a designated coin in or total wager in level. The gaming machine makes a determination based on data from the player's preferences. Based on this determination, the gaming machine determines to give the player tickets based on the player's preference selections. The player picked country music to listen to and therefore the gaming machine matches the player's preference of country music with the promotion of country music movie tickets. The gaming machine informs the player to go to a cashier to redeem the tickets won by the player. It should be appreciated that the gaming establishment or gaming system may enable the player to redeem comps, promotions or prizes in any suitable manner.

As illustrated in FIGS. 6A, 6B, 6C, 6D, 6E and 6F, in another embodiment, a gaming machine enables the player to pick a category of player preferences and then to further pick the specific player preference. That is, the preference selections or preferences offered to the players are multi-tiered preferences. These preferences may better accommodate different players or a player's mood.

Figure 6A:
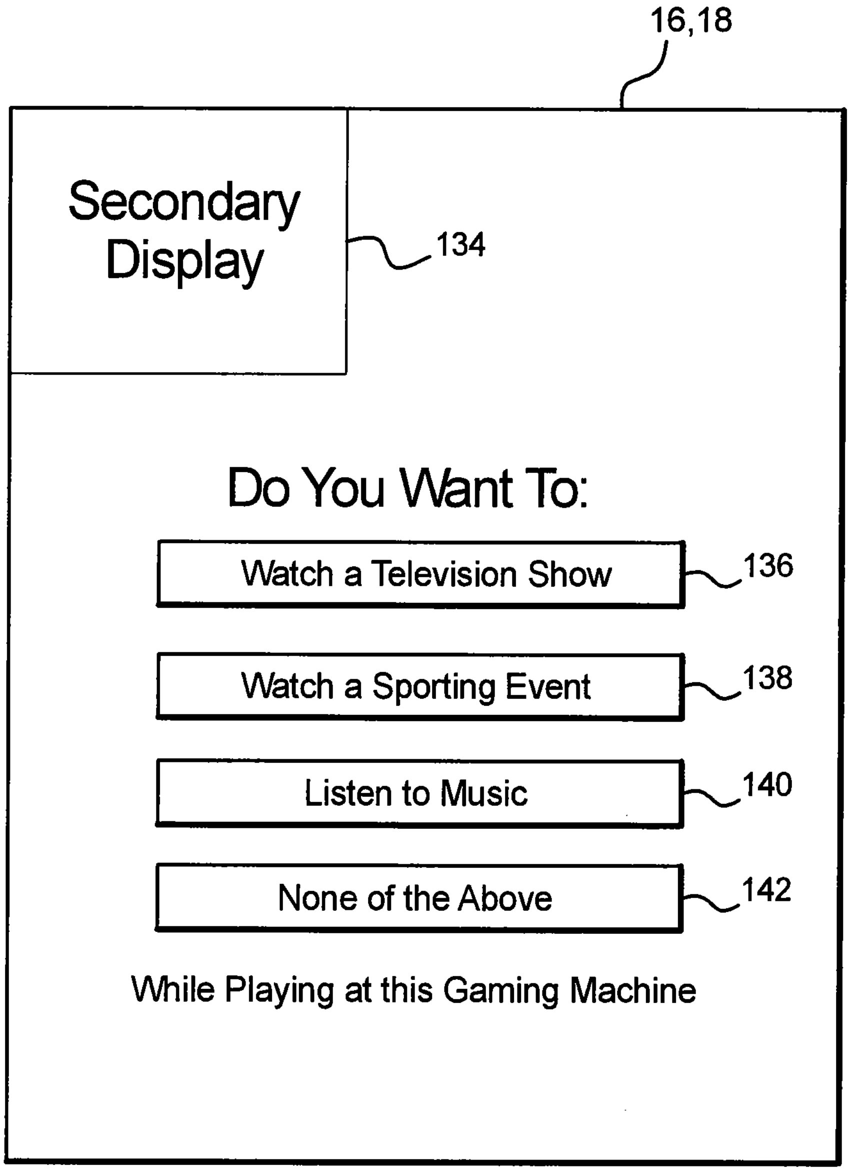
FIGS. 6A, 6B, 6C, 6D, 6E and 6F are screen shots of a gaming machine including a secondary display which displays a television show selected by the player.
Figure 6B:
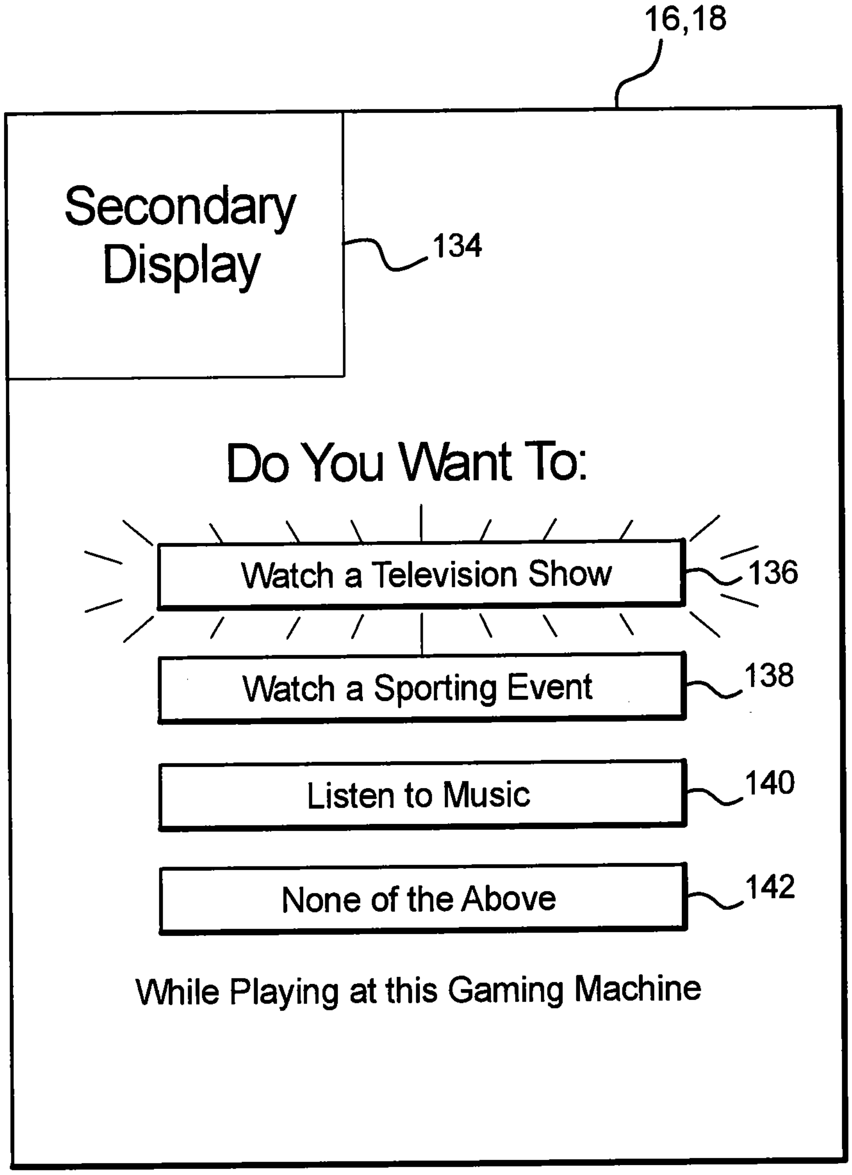

As illustrated in FIG. 6A, in one embodiment, the gaming machine includes a display device 16 and 18 that includes a secondary display or an entertainment display 134. The secondary display 134 may be displayed on one of the display devices simultaneously with a game or other information, as illustrated, or the secondary display may be displayed individually on a display device. For example, a first display device displays the games and game related information and the second display device displays the player's preference selections. In another embodiment, As illustrated in FIG. 6A, the gaming machine enables the player to select from a plurality of categories of preferences. As illustrated in FIG. 6A, the gaming machine enables the player to select from watching a television show 136, watching a sporting event 138, listening to music 140 or none of the above 142 while the player is playing the gaming machine. As illustrated in FIG. 6B, the player selects to watch a television show 136 while playing at the gaming machine. It should be appreciated that the selections may be any suitable selection such as a watching resort video or a gaming video, watching a music video or any other suitable entertainment selection or content.

Figure 6C:
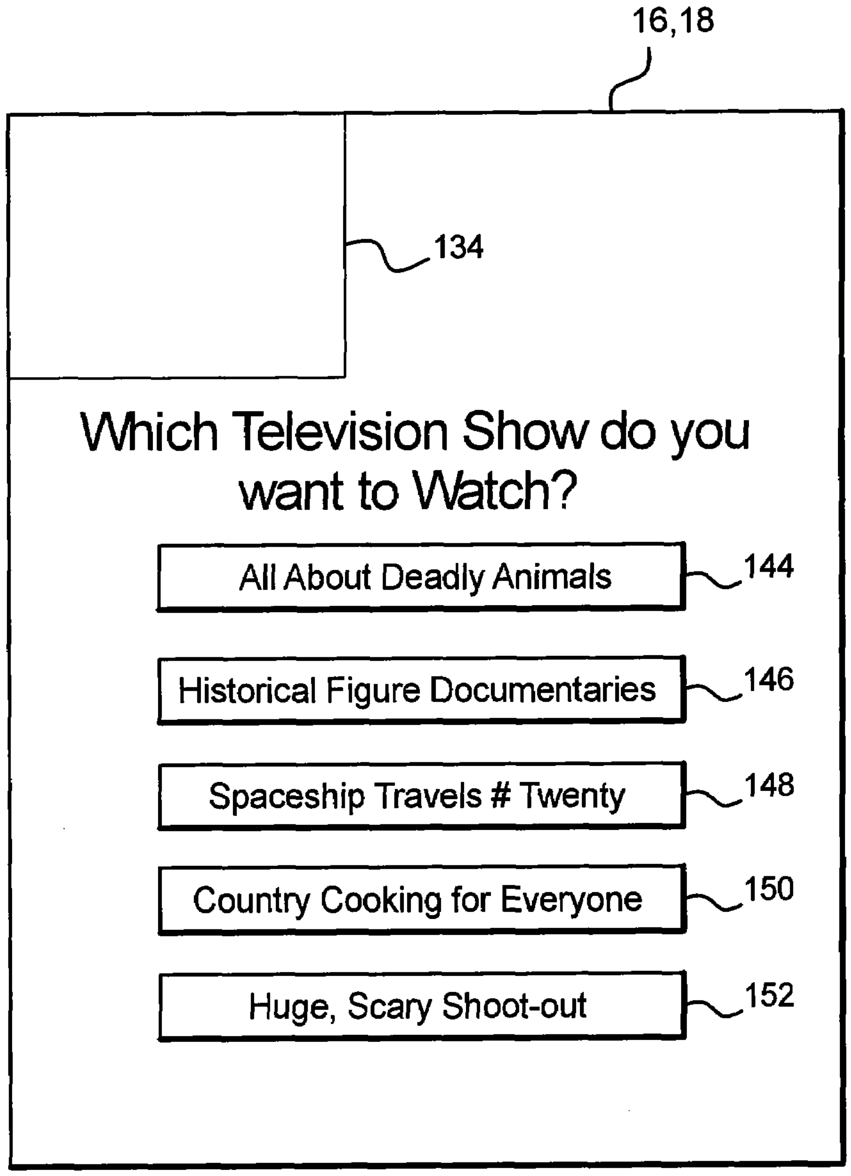
Figure 6D:
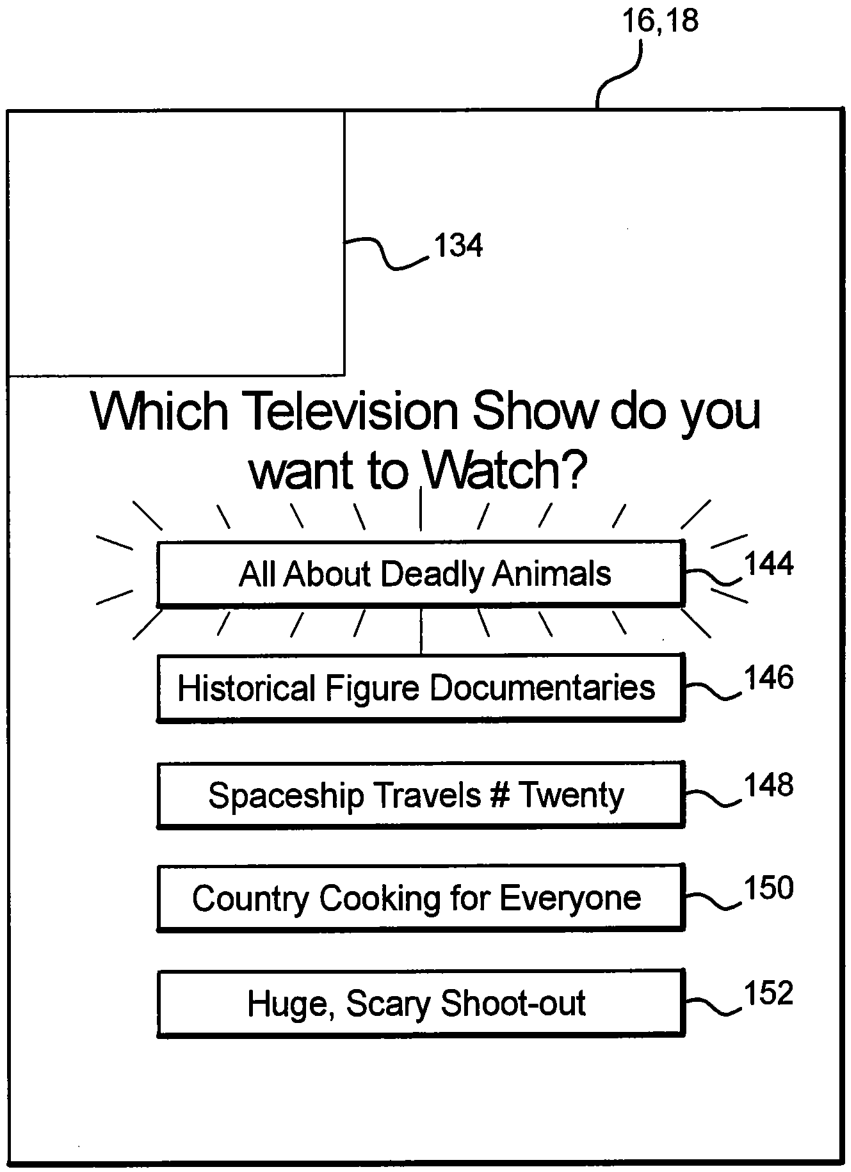

As illustrated in FIG. 6C, the gaming machine offers the player another set of preferences selections or choices. As illustrated in FIG. 6C, the gaming machine enables the player to select a television show. The gaming machine provides a variety of different types of television programs: All About Deadly Animals 144, Historical Figures Documentary 146, Spaceship Travels # Twenty 148, Country Cooking for Everyone 150 and Huge, Scary Shootout 152. As illustrated in FIG. 6D, a player selects to watch All About Deadly Animals 144.

Figure 6E:
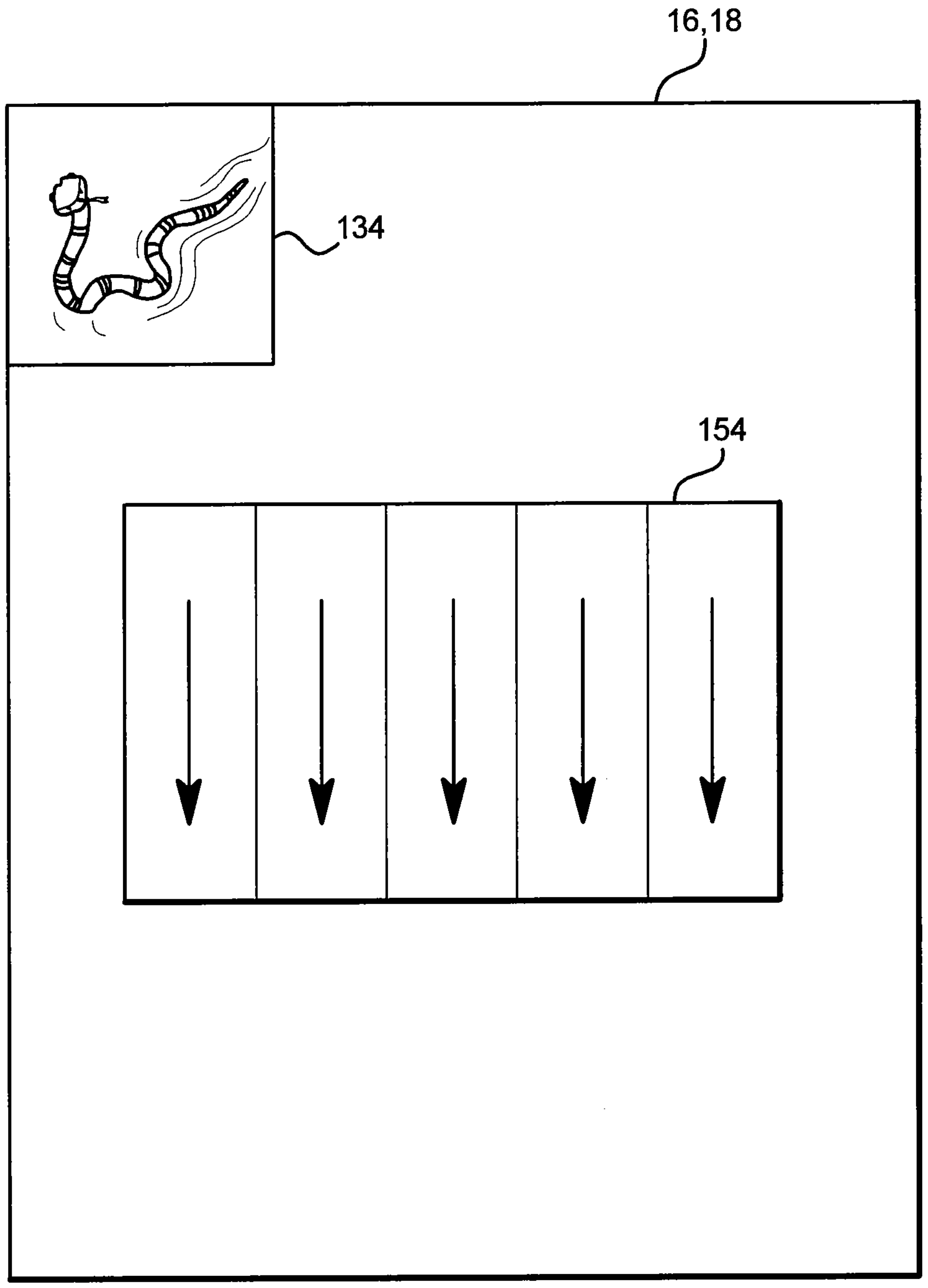

As illustrated in FIG. 6E, the display device displays the selected television show in the secondary display portion 134 simultaneously with another portion of the display device displaying a slot game 154. It should be appreciated that the secondary display may be any suitable size and shape. In the illustrated embodiment, the secondary content display is a small window in the corner of the display device. However, the secondary display may be displayed in any suitable portion or area of a display device.

Figure 6F:
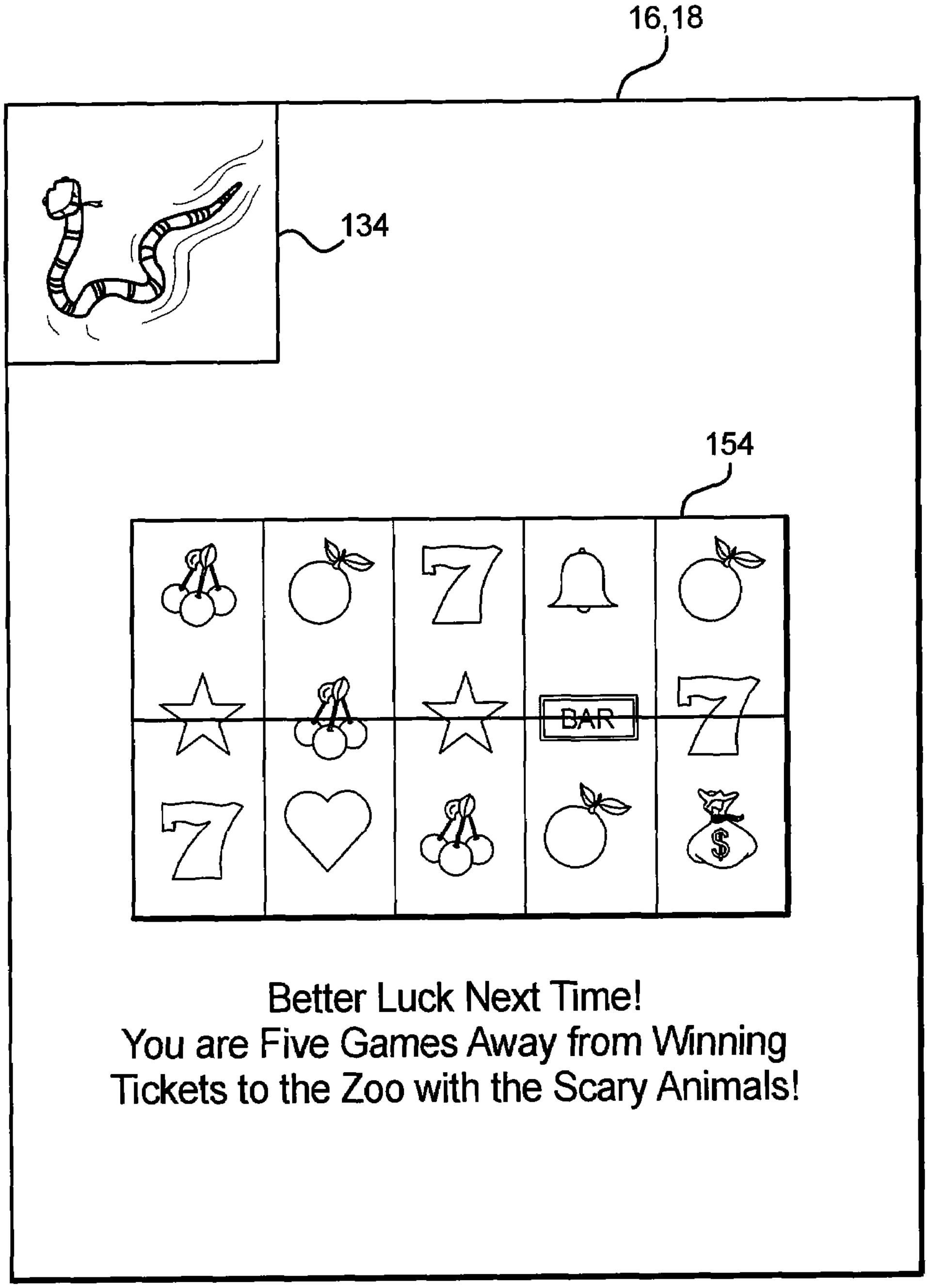

As illustrated in FIG. 6F, the player does not win the slot game. However, the gaming machine informs the player if the player plays five more slot games they will be rewarded free tickets to the zoo. The gaming machine is creating incentive for the player to continue play on that gaming machine. The player may choose whether to play another game or not.

In one embodiment, the gaming system automatically determines a preference for the player based on previous preferences. For example, if a player chooses to listen to rock and roll ten times in a row, when a player logs onto a gaming machine, the gaming machine automatically plays rock and roll music. That is, the player does not have to repeat the same preference indefinitely. In one such embodiment, the player has the option of changing the automatic preference to a new preference. In another embodiment, a player has the option of choosing the preference for a period of time or indefinitely. It should be appreciated that the gaming system may automatically determine and enact a preference based on any suitable criteria. It should also be appreciated that in one embodiment the gaming machine can include an input device that enables the player to change any of the player's selected preferences at any suitable time.

In one embodiment, the gaming system automatically determines a preference based on a previous preference in a certain time period. For example, if a player makes a preference on one gaming machine and then switches to play of another gaming machine in the same day, the gaming system automatically enacts the player's preference from earlier that day on the new gaming machine. It should be appreciated that the time period may be any suitable time period. In one such embodiment, the player has the option of changing the automatic preference to a new preference.

In another embodiment, instead of enabling the player to make a selection or an input for a player preference, a gaming establishment may include themed areas or theme slot machine banks. Therefore, by choosing to play on a certain gaming machine or in a certain area, the player is making or exhibiting a preference. The gaming system tracks the player preferences to provide the player one or more awards or offers based on the players' preferences.

In another embodiment, a gaming machine enables a player to choose the theme or a game at one of the gaming machines. For example, in additional to a music video, the player may pick a general theme and the gaming machine changes one or more aspects of game play and additionally provide secondary content based on the player's choice.

It should be appreciated that the awards, promotions or comps may be determined in any suitable manner. In one embodiment, the gaming machine or system includes a comp triggering event that enables a player to receive a comp. In another embodiment, the gaming machine or system includes promotion criteria. To receive a promotion or comp, the player must meet the promotion criteria. These criteria may be specifically related to the player such as total coin in or wagers in since joining the rewards program, coin in or wagers in for an allotted time period, number of games played during a certain time period or any other suitable player statistic. In an alternative embodiment, the gaming machine or gaming system award comps or promotions based on a non-player specific events or information, such as the number of gaming machines currently being played or the total coin-in at different points in the day. In one embodiment, the value of the comp provided to a player is related to the statistical and wagering information of that player. That is, each player has a determined worth based on their wagering habits. The value of the promotion provided to the player is based on this specific worth. It should be appreciated that the player comps and promotions may be awarded for any suitable reason.

It should be appreciated that the gaming machine or system may base the determination the comps, awards or promotions to provide in any suitable manner. In one embodiment, the gaming machine or system, at least in part, bases the determination on the data collected from a player's last chosen preference. In another embodiment, the gaming machine and/or system tracks data based on the percentage of time a player watches or listens to the preference categories and/or subjects. For example, if the gaming machine and/or system collects data that a player watches television 50% of game playing time, listens to music 20% of game playing time and 30% of game playing time chooses not to enact a preference selection, the gaming system may provide the player with comps that relate to television and music. In one embodiment, the comps or promotions are proportional to the player selections. That is, the gaming machine and/or system weights the promotions in any suitable manner. For example, 50% of the comps relate to television and 20% of the comps relate to music. In another embodiment, the gaming machine and/or system monitors and stores data related to the particular subjects selected by the player. For example, in the above example, 50% of playing time, the player watches television. Of this time, 75% of the time the player watches sports events or programming and 25% of the time the player watches cooking programming. In one embodiment, the gaming machine and/or system bases the determinations for the promotions based off of the subject matter. For example, a majority of the time, the gaming machine and/or system provides the player with sports related promotions, and a minority of the time, the gaming machine and/or system provides the player with gift certificates for restaurants. In another embodiment, the gaming machine and/or system tracks the time of day, week and/or month that the player watches certain programming and provides them with promotions based on that data. For example, if a player watches movies during the week and sporting events on the weekend, the gaming machine may determine to provide the player with movie related promotions during the week and sporting related promotions on the weekend.

In another embodiment, the gaming machine or system bases the determination on a predetermined number of the same or related selections. For example, when the player selects fifteen preferences that are related to sports, the gaming machine or system, at least in part, bases the determination on sports. In another embodiment, the gaming machine or system bases the determination on the most frequently picked preference subject matter or related preference. For example, if the player selects eight preferences related to sports and six preferences related to country music, the determination will be based on the sports preferences.

It should be appreciated that the gaming system may use a more complicated analysis of the data stored from the preference selections to determine which comp, promotion or incentive to provide the player. In certain embodiments, the determination is based on data stored from multiple different player preference selection categories. In another embodiment, the determination is based on data stored from every player preference selection made by the player. It should be appreciated that the determination of which comp, promotion or incentive to provide the player may be based on any suitable number and combination of the data collected from the player preferences. For example, the decision of which promotion to provide to the player may be based on the data collected from five player preference categories, such as music, symbol preference, game preference, denomination preference, and secondary entertainment preference categories. In another embodiment, the gaming system may determine the promotion to player based on only one preference category but may use a complicated analysis of data stored about what the player selected and what the player did not select to determine the comp to provide the player. For example, the only comps available to a gaming establishment are rock and roll music concert tickets and rap music concert tickets. From a simple analysis of the player's data, it is clear the player chooses to listen to country music most of the time. However, since country music concert tickets are not available, the gaming system uses information obtained about other preference selections to determine which tickets to provide the player. For example, the player has chosen rap music and rock and roll music the same number of times. However, the player listens to rock and roll music for a longer time period than rap music. Also, frequently when one of the choices is rap music, the player chooses to not listen to any music. However, every time that a rock and roll preference selection has been offered while a country music preference selection has not been offered, the player has chosen to listen to rock and roll music. Therefore, the gaming system determines to provide the rock and roll concert tickets to the player. It should be appreciated that the gaming system may use any suitable data in the analysis of which promotion to provide to the player.

It should be appreciated the gaming machine and/or system may base the determination of which promotion to provide the player on any suitable preference conditions. In one embodiment, if the player's account meets a preference condition, upon an occurrence of a predetermined promotion criteria being filled by the player's account, the gaming system provides the player a promotion, at least in part, based on the data collected from the player's preferences. For example, the preference condition is choosing a same subject matter 75% of the time. If the player's data does not meet this preference condition, the gaming system provides the player with a generalized comp instead of a comp relating to or based on the preferences. That is, in one embodiment, if the player does not meet one or more the preference conditions, upon an occurrence of a predetermined promotion criteria being filled by the player, the gaming system provides the player a promotion not based on the data collected from the player's preferences.

In another embodiment, the gaming machine and/or system collects technical data about the choices. In one embodiment, the gaming system determines to provide the player a promotion based on the volume level the player uses. For example, if a player really enjoys a sporting event or a song, the player may heighten the volume when the sporting event or song is on. The gaming machine and/or system uses this data to provide the player with a promotion. It should be appreciated that the gaming machine and/or system may monitor and use any suitable data obtained or related to the player preferences.

In one embodiment, the gaming machine and/or system provides the player with an option to select one or more types of comps, promotions or incentives the player may be interested in. The gaming system can take this into account when determining player comps, promotions and incentives.

It should be appreciated that the gaming machine and system may store data about a player's preferences in any suitable manner. In one embodiment, the players' preferences are stored in the same account, profile or database as other player tracking information, such as how much the player wagered and how many games the player plays. In another embodiment, the preference information or data from the preferences are maintained by a separate system or in a separate profile. For example, in one embodiment, the gaming machine and/or system sends the data to the customer retention management system. In one embodiment, the customer retention management system or a customer management system analyzes the data for certain trends or to determines the promotions to provide to the player.

It should be appreciated that the preferences may be offered to the player may be any suitable preferences. For example, the preferences may be auditory such as background music. The preferences may be purely visual such as artwork of the game or the colors used in the game. Additionally, the preferences may be auditory and visual preferences, such as music videos, television and movies or movie trailers.

The gaming machine or system may enable the player to select the preferences in any suitable manner. In one embodiment, the player makes an input through a player input device such as a button or a touch screen. In another embodiment, the gaming machine and/or system enables the player to pre-pick their preferences. For example, a player may select choices over the Internet. In another embodiment, the player preselects the preferences on a kiosk or on a gaming machine.

In another embodiment, the preferences provided to a player may be based on one or more characteristics of the player or previous selections made by the player. In one embodiment, the gaming machine and/or system includes a plurality of different packages of preference selections. The gaming machine or system determines which package of preference selections to provide to the player based on a characteristic of the player. For example, the gaming system may provide selections based on age group and/or sex. For example, the gaming machine may determine the player's age and sex from a player tracking account and may provide preferences based on the information. For example, if the gaming machine determines that the player is male and in the 21 to 29 age group, the gaming machine provides the player a first set of player preference selections. If the player is female and in the 21 to 29 age group, the gaming machine provides the player a second set of player preference selections. It should be appreciated that the sets or packages of player preferences may be determined in any suitable manner. In one embodiment, a player's prior preferences determine or influence which preference selections are provided to the player. For example, in one embodiment, if a player continually chooses to watch sporting events, the gaming machine and/or system will present the player with sports specific preferences providing the player the ability to have more preference choices in the player's area of interest.

It should be appreciated that the gaming machine and system may enable the player to change preferences or to select a new preference in any suitable manner. For example, every half-hour a player may select a new preference. In another embodiment, a player may have to wager a designated amount or play a designated number of games to select a preference. In one embodiment, the player may make an input to change the preference. For example, if a player feels that their preference selection is bringing them bad luck, the player may make an input to change the preference or to simply play in regular mode.

The gaming machine and/or system may enable the player to select any suitable manner of preferences. For example, the gaming system may enable the player to select an audio-visual preference and then the language to listen to the audio component of the preference. In one such embodiment, the gaming machine and/or system uses data from the selected language preference to determine one or more promotions for the players. In one such embodiment, the gaming machine and/or system uses data from the selected language preference to determine advertisements for the players. In another embodiment, the gaming machine and/or system only enables the player to select a predetermined or random number of preferences.

Additionally, it should also be appreciated that a player may not be required to have preferences. In one embodiment, the player is given a choice not to change anything on the gaming machine but to play in normal mode.

In one embodiment, the player must meet a certain wager requirement to be presented with one or more preference selections. In one embodiment, the player must wager the maximum wager amount for a certain number of games to be offered a preference selection. In another embodiment, the player must place a side wager to be enabled to make a preference selection. In another embodiment, the player must pay for the preference selection. In one such embodiment, the player may pay one amount for enactment of one preference selection and another amount for the enactment of another preference selection. In one embodiment, different players have to pay different amounts for the preference selections. That is, the gaming machine and/or system may offer a discount to certain players for the preference selections. For example, a silver member of a player tracking card has to pay $5 for each enactment of a preference selection and a gold member of a player tracking card has to pay $1 for each enactment of a preference selection. In one embodiment, the gaming machine and/or system only requires certain players to pay for preferences selections or to meet wager requirements for preference selections and does not require other players to pay for preferences selections or to meet wager requirements for preference selections. For example, all players that are not members of a player tracking club or have not identified themselves at the gaming machine must pay for player preferences and all players who have logged onto a gaming machine do not have to pay for preference selections. In one such embodiment, only logged on players are offered preference selections by the gaming machine and/or system. That is, in one embodiment, the gaming machine only provides players that are members of a player tracking system and identified at the gaming machine preference selections. It should be appreciated that a player may earn or buy preference selections in any suitable manner.

It should be appreciated that the player preferences may be displayed or offered to the player in any suitable manner. In one embodiment, the gaming machine includes a secondary display where visual preferences are displayed. In one such embodiment, the player's preference is displayed individually on a display device. In another embodiment, the preference is displayed on a secondary display of a display device also displaying other content. For example, the preference is displayed picture in picture on the same display device which displays the game. In another embodiment, the gaming machine does not display information about the preferences but the gaming system communicates the choices to the player in another method. For example, the preferences include different types of music to listen to and the gaming machine includes a tuner. The common display devices and signs display which radio stations or frequency stations include which kind of music. For example, the signs may display "tune the tuner to 1 to listen to sports updates, tune the tuner to 2 to listen to classical and tune the tuner to 3 to listen to rock." In one such embodiment, the individual gaming machines never display information about the preferences. In another example, the gaming machine includes headphones. The preferences available to the player are presented to the player auditory through the use of the headphones.

It should also be appreciated that the gaming machine and/or the system may enable the player to listen to any audio components of preference selections in any suitable manner. In one embodiment, the gaming machine and/or system includes speakers which play any audio components. In another embodiment, a gaming machine includes headphones and enables the player to listen to the audio components through the headphones.

In one embodiment, the gaming machine and/or system uses the data stored from the player's preferences to provide advertisements to the player. The gaming machine and/or system may provide advertisements to the player in any suitable manner. In one embodiment, the gaming machine and/or system provides third party advertisements to the player on the gaming machine based on the data stored regarding the player's preferences. For example, data stored about the player indicates that the player likes baseball, so the gaming machine advertises hot dogs and peanuts to the player at the gaming machine. In another embodiment, the gaming machine and/or system provides resort or gaming establishment advertisements to the players on the gaming machine based on the data stored regarding the player's preferences. In another embodiment, the gaming establishment uses gaming machine and/or system for advertisements and does not provide the player preference selections. For example, if a gaming establishment is hosting a certain performer, the gaming establishment plays that performer's song when a player logs into a gaming machine. In one such embodiment, the gaming machine may then give the player preference selections. That is, the gaming establishment uses the systems or apparatuses used for the enactment of preference selections for promotional purposes. In one such embodiment, the gaming machine and/or system obtains data from the promotion to determine future events at the gaming establishment. For example, if enough players turn the promotion off, the gaming establishment does not bring in the performer or have the event. In another embodiment, the gaming system markets or advertises third party products or the casino through other forms of advertising. For example, the gaming establishment may email or mail the player advertisements based on that data associated with that player.

In another embodiment, the gaming machine advertises third party advertisements or resort advertisements in a game. For example, if the advertisements are for a home improvement store, the gaming machine uses nail and hammer symbols in the game. It should be appreciated that the gaming machine and/or system may provide advertisements to players in any suitable manner.

In an alternative embodiment, the gaming system uses the player preferences as a marketing tool. For example, the gaming establishment may choose to bring in entertainers that people frequently indicate an interest in. For example, if a majority of players frequently choose Mr. X, the recording artist, the gaming establishment may use that data in a determination to have Mr. X perform a concert at the gaming establishment. In another example, if a majority of the people change the channel of the radio when Mr. Y comes on, the gaming establishment may decide not to have Mr. Y perform.

It should be appreciated that the gaming establishment, gaming machines and/or system may use any suitable methods to market or promote events.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a central controller;
a player tracking system; and
a gaming machine;
the gaming machine, the player tracking system and the central controller including at least one processor, and at least one memory device which stores a plurality of instructions, which when executed by the at least one processor:
(a) enables a player to choose a preference selection from a plurality of different preference selections without choosing a preference for any of a plurality of promotions and without notifying the player of any of the plurality of promotions, and wherein the preference selection is unrelated to any feature of any game play provided by the gaming machine;
(b) determines the preference selection chosen by the player;
(c) stores data based on the preference selection chosen by the player in association with a player account;
(d) enacts the preference selection chosen by the player on the gaming machine;
(e) enables the player to play a primary game while the at least one preference selection chosen by the player is enacted;
(f) upon the player account meeting a promotion criteria, determines one of the plurality of promotions to provide the player, the plurality of promotions being different from the preference selections, and wherein the determination is based, at least in part, on the preference selection stored data; and
(g) causes any determined promotion to be provided to the player, wherein any promotion provided to the player is redeemable for a good or service.

2. The gaming system of claim 1, wherein the preference selections are auditory selections.

3. The gaming system of claim 1, wherein the preference selections are visual selections.

4. The gaming system of claim 1, wherein the preference selections are audio-visual selections.

5. The gaming system of claim 1, wherein the promotion criteria is based on how much the player wagers.

6. The gaming system of claim 1, wherein the gaming machine, the player tracking system and the central controller are configured to enable the player to change the preference selection chosen by the player.

7. The gaming system of claim 1, wherein the gaming machine, the player tracking system and the central controller are configured to enable the player to choose a category of preferences and to choose one of the preference selections based on the chosen category.

8. The gaming system of claim 1, wherein the determination is based on how many times the player has chosen each of the preference selections.

9. The gaming system of claim 1, wherein the data is the preference selection chosen by the player.

10. The gaming system of claim 1, wherein the data is information related to the preference selection chosen by the player.

11. The gaming system of claim 1, wherein upon the player account meeting promotion criteria, the gaming machine, the player tracking system and the central controller are configured to determine one of the promotions to provide the player additionally based on additional data stored in the player account based on previous preference selections made by the player.

12. A gaming system comprising:
a central controller;
a player tracking system; and
a gaming machine;
the gaming machine, the player tracking system and the central controller including at least one processor, and at least one memory device which stores a plurality of instructions, which when executed by the at least one processor:
(a) enables a player to choose a preference selection from a plurality of different preference selections without choosing a preference for any of a plurality of promotions and without notifying the player of any of the plurality of promotions, and wherein the preference selection is unrelated to any feature of any game play provided by the gaming machine;
(b) determines the chosen preference selection;
(c) stores data based on the chosen preference selection in association with a player account for the player;
(d) causes a gaming environment of said gaming machine to change based on the chosen preference selection;
(e) enables the player to play a primary game operable upon a wager;
(f) determines if the player account has met a predetermined promotion criteria;
(g) if the player account has met the predetermined promotion criteria, determines one of the plurality of promotions to provide the player, the plurality of promotions being different from the preference selections, and wherein if the player account has met a preference condition, the determination is based, at least in part, on the preference selection chosen by the player; and
(h) causes any determined promotion to be provided to the player, wherein any promotion provided to the player is redeemable for a good or service.

13. The gaming system of claim 12, wherein the preference selections are auditory selections.

14. The gaming system of claim 12, wherein the preference selections are visual selections.

15. The gaming system of claim 12, wherein the preference selections are audio-visual selections.

16. The gaming system of claim 12, wherein the predetermined promotion criteria is based on how much the player wagers.

17. The gaming system of claim 12, wherein the gaming machine, the player tracking system and the central controller are configured to enable the player to change the chosen preference selection.

18. The gaming system of claim 12, wherein the gaming machine, the player tracking system and the central controller are configured to enable the player to choose a category of preferences and to choose one of the preference selections based on the chosen category.

19. The gaming system of claim 12, wherein the preference condition is a number of times the player has chosen at least one of the preference selections.

20. The gaming system of claim 12, wherein the preference condition is a percentage of time the player has chosen at least one of the preference selections.

21. The gaming system of claim 12, wherein the preference condition is one of the preference selections being chosen more times than another one of the preference selections.

22. The gaming system of claim 12, wherein the preference condition is based on preference selections from multiple categories.

23. The gaming system of claim 12, wherein if the player account has met the predetermined promotion criteria and if the player has not met the preference condition, the determination is a random determination.

24. The gaming system of claim 12, wherein if the player account has met the predetermined promotion criteria, the gaming machines, the player tracking system and the central controller are configured to determine one of the promotions to provide the player, wherein if the player account has met the preference condition, the determination is additionally based on additional data stored in association with the player account based on previous preference selections chosen by the player.

25. A method of operating a gaming system, said method comprising:

(a) enabling a player to choose a preference selection from a plurality of different preference selections on a gaming machine without choosing a preference for any of a plurality of promotions and without notifying the player of any of the plurality of promotions, and wherein the preference selection is unrelated to any feature of any game play provided by the gaming system;

(b) determining the preference selection chosen by the player;

(c) storing data based on the preference selection chosen by the player in association with a player account;

(d) enacting the preference selection chosen by the player on the gaming machine;

(e) enabling the player to play a primary game on the gaming machine while enacting the preference selection chosen by the player;

(f) upon the player account meeting a promotion criteria, determining a promotion from the plurality of promotions to provide the player, the promotions being different than the preference selections and the determination is based, as least in part, on the preference selection stored data; and (g) causing any determined promotion to be provided to the player, wherein any promotion provided to the player is redeemable for a good or service.

26. The method of claim 25, wherein the preference selections are auditory selections.

27. The method of claim 25, wherein the preference selections are visual selections.

28. The method of claim 25, wherein the preference selections are audio-visual selections.

29. The method of claim 25, wherein the promotion criteria is based on how much the player wagers.

30. The method of claim 25, which includes enabling the player to change the preference selection chosen by the player.

31. The method of claim 25, which includes enabling the player to choose a category of preferences and to choose one of the preference selections based on the chosen category.

32. The method of claim 25, which includes basing the determination on how many times the player has chosen each of the preference selections.

33. The method of claim 25, wherein the data is the preference selection chosen by the player.

34. The method of claim 25, wherein the data is information related to the preference selection chosen by the player.

35. The method of claim 25, which includes upon the player account meeting promotion criteria, determining one of the promotions to provide the player additionally based on additional data stored in association with the player account based on previous preference selections made by the player.

36. The method of claim 25, which is provided through a data network.

37. The method of claim 36, wherein the data network is the internet.

38. A method of operating a gaming system, said method comprising:

(a) enabling a player to choose a preference selection from a plurality of different preference selections on a gaming machine without choosing a preference for any of a plurality of promotions and without notifying the player of any of the plurality of promotions, and wherein the preference selection is unrelated to any feature of any game play provided by the gaming system;

(b) determining the chosen preference selection;

(c) storing data based on the chosen preference selection in association with a player account for player;

(d) causing a gaming environment of the gaming machine to change based on the chosen preference selection;

(e) enabling the player to play a primary game on the gaming machine;

(f) determining if the player account has met a predetermined promotion criteria;

(g) if the player account has met the predetermined promotion criteria, determining one of the plurality of promotions to provide the player, the plurality of promotions being different from the plurality of preference selections, and wherein if the player account has met a preference condition, the determination is based, at least in part, on the preference selection chosen by the player; and (h) causing any determined promotion to be provided to the player, wherein any promotion provided to the player is redeemable for a good or service.

39. The method of claim 38, wherein the preference selections are auditory selections.

40. The method of claim 38, wherein the preference selections are visual selections.

41. The method of claim 38, wherein the preference selections are audio-visual selections.

42. The method of claim 38, wherein the predetermined promotion criteria is based on how much the player wagers.

43. The method of claim 38, which includes enabling the player to change the chosen preference selection.

44. The method of claim 38, which includes enabling the player to choose a category of preferences and to choose one of the preference selections based on the chosen category.

45. The method of claim 38, wherein the preference condition is a number of times the player has chosen at least one of the preference selections.

46. The method of claim 38, wherein the preference condition is a percentage of time the player has chosen at least one of the preference selections.

47. The method of claim 38, wherein the preference condition is one of the preference selections being chosen more times than another one of the preference selections.

48. The method of claim 38, wherein the preference condition is based on preference selections in multiple preference categories.

49. The method of claim 38, wherein if the player account has met the predetermined promotion criteria and if the player has not met the preference condition, the determination is a random determination.

50. The method of claim 38, wherein if the player account has met a preference condition, the determination is additionally based on additional data stored in association with the player account based on previous preference selections made by the player.

51. The method of claim 38, which is provided through a data network.

52. The method of claim 51, wherein the data network is the internet.

* * * * *

UNITED STATES PATENT AND TRADEMARK OFFICE

CERTIFICATE OF CORRECTION

PATENT NO. : 8,491,392 B2
APPLICATION NO. : 11/552451
DATED : July 23, 2013
INVENTOR(S) : Anthony J. Baerlocher It is certified that error appears in the above-identified patent and that said Letters Patent is hereby corrected as shown below:

IN THE CLAIMS

In Claim 1, Column 33, Line 19, delete ",".
In Claim 1, Column 33, Line 27, delete "and".
In Claim 1, Column 33, Line 37, delete "at least one".
In Claim 1, Column 33, Line 42, delete "and".
In Claim 11, Column 34, Line 7, between "meeting" and "promotion" insert --the--.
In Claim 12, Column 34, Line 18, delete ",".
In Claim 12, Column 34, Line 26, delete "and".
In Claim 12, Column 34, Line 43, delete "and".
In Claim 23, Column 35, Line 16, between "player" and "has" insert --account--.
In Claim 25, Column 35, Line 33, delete "and".
In Claim 25, Column 35, Line 49, replace "is" with --being--.
In Claim 35, Column 36, Line 9, between "meeting" and "promotion" insert --the--.
In Claim 37, Column 36, Line 16, replace "the" with --an--.
In Claim 38, Column 36, Line 23, delete "and".
In Claim 38, Column 36, Line 39, delete "and".
In Claim 49, Column 37, Line 5, after "player" insert --account--.
In Claim 50, Column 37, Line 9, replace "a" with --the--.
In Claim 52, Column 37, Line 16, replace "the" with --an--.

Signed and Sealed this
Twenty-second Day of October, 2013

Teresa Stanek Rea
*Deputy Director of the United States Patent and Trademark Office*

UNITED STATES PATENT AND TRADEMARK OFFICE

CERTIFICATE OF CORRECTION

PATENT NO. : 8,491,392 B2
APPLICATION NO. : 11/552451
DATED : July 23, 2013
INVENTOR(S) : Anthony J. Baerlocher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this
Thirteenth Day of January, 2015

Michelle K. Lee

Michelle K. Lee
*Deputy Director of the United States Patent and Trademark Office*